United States Patent
El-Sherif et al.

(10) Patent No.: US 11,714,959 B2
(45) Date of Patent: *Aug. 1, 2023

(54) COMPUTER-IMPLEMENTED INFRASTRUCTURE, METHODS, SYSTEMS, AND COMPUTER-READABLE MEDIA FOR GENERATING AND MANAGING PRODUCT LABELS FOR A PRODUCT ACROSS A PLURALITY OF JURISDICTIONS

(71) Applicant: RN Enterprises, LLC, Yardley, PA (US)

(72) Inventors: Dalia El-Sherif, Wayne, PA (US); Carol Rutkowski, Plymouth Meeting, PA (US); Michael Scott Swalina, Glenmoore, PA (US)

(73) Assignee: RN Enterprises, LLC, Yardley, PA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/389,904

(22) Filed: Jul. 30, 2021

(65) Prior Publication Data

US 2021/0357583 A1 Nov. 18, 2021

Related U.S. Application Data

(63) Continuation of application No. 16/317,182, filed as application No. PCT/US2017/041864 on Jul. 13, 2017, now Pat. No. 11,080,478.

(Continued)

(51) Int. Cl.
*G06F 40/186* (2020.01)
*G06Q 10/08* (2023.01)
(Continued)

(52) U.S. Cl.
CPC .............. *G06F 40/186* (2020.01); *G06F 7/00* (2013.01); *G06Q 10/00* (2013.01);
(Continued)

(58) Field of Classification Search
None
See application file for complete search history.

(56) References Cited

U.S. PATENT DOCUMENTS

| | | | |
|---|---|---|---|
| 6,862,585 B2 * | 3/2005 | Planalp ................... | G06Q 10/06 |
| 7,181,304 B2 * | 2/2007 | Key ......................... | G06Q 40/08 |
| | | | 700/100 |

(Continued)

*Primary Examiner* — Frank D Mills
(74) *Attorney, Agent, or Firm* — Riverside Law LLP

(57) ABSTRACT

A system for generating product label changes is described. The system includes a product labeling platform executable on a network enabled computing device and a database of at least one selectable master label and at least one selectable jurisdiction label associated with a labeled product. The platform associates at least one selected descriptor from a first pre-defined descriptor set to each change made to a selected master label, and further associates at least one selected descriptor from a second pre-defined descriptor set to each change made to a selected jurisdiction label. The platform further associates a report including the selected descriptors from the first and second pre-defined descriptor sets with the changed label. A system for generating and managing product labels for a product across multiple jurisdictions is also disclosed. Methods including a computer-implemented method of updating a product label and a computer-implemented method of generating and managing product labels for a product across a plurality of jurisdictions are also disclosed.

20 Claims, 25 Drawing Sheets

Related U.S. Application Data

(60) Provisional application No. 62/393,663, filed on Sep. 13, 2016, provisional application No. 62/361,874, filed on Jul. 13, 2016.

(51) Int. Cl.
  *G06Q 10/00* (2023.01)
  *G06F 7/00* (2006.01)
  *G06Q 10/0639* (2023.01)
  *G06Q 10/087* (2023.01)
  *G09F 3/00* (2006.01)

(52) U.S. Cl.
  CPC ....... *G06Q 10/06395* (2013.01); *G06Q 10/08* (2013.01); *G06Q 10/087* (2013.01); *G09F 3/00* (2013.01)

(56) References Cited

U.S. PATENT DOCUMENTS

| | | | | |
|---|---|---|---|---|
| 7,249,072 | B1* | 7/2007 | Nearhood | G06Q 10/10 705/31 |
| 7,925,550 | B2* | 4/2011 | Kataria | G06Q 10/087 705/28 |
| 8,037,004 | B2* | 10/2011 | Rajkumar | G06Q 10/10 706/50 |
| 8,914,341 | B2* | 12/2014 | DiFalco | G06F 16/122 707/694 |
| 10,325,239 | B2* | 6/2019 | Gittleman | G06Q 10/0832 |
| 2004/0019496 | A1 | 1/2004 | Angle | |
| 2004/0111934 | A1* | 6/2004 | O'Connell | G09F 3/02 40/310 |
| 2004/0125405 | A1* | 7/2004 | Salomon | G06Q 10/00 358/1.18 |
| 2004/0128272 | A1* | 7/2004 | Salomon | G06Q 10/087 |
| 2004/0193634 | A1* | 9/2004 | Goodlett | G06Q 10/06 707/999.102 |
| 2005/0114193 | A1* | 5/2005 | Kroening | G06Q 10/06 705/400 |
| 2006/0015536 | A1* | 1/2006 | Buchanan | G06Q 10/00 |
| 2006/0053168 | A1* | 3/2006 | McDougall | G06F 40/186 |
| 2007/0016924 | A1* | 1/2007 | Ishida | B41J 3/4075 725/38 |
| 2011/0066458 | A1* | 3/2011 | Dale | G06Q 30/018 705/1.1 |
| 2012/0072859 | A1 | 3/2012 | Wang | |
| 2013/0151427 | A1* | 6/2013 | Whelan | G09F 3/08 705/317 |
| 2013/0265592 | A1* | 10/2013 | Bellagamba | G06Q 30/0276 358/1.6 |
| 2014/0278457 | A1 | 9/2014 | Weiler | |
| 2015/0020213 | A1* | 1/2015 | Decouteau | H04L 63/105 726/27 |
| 2015/0052028 | A1 | 2/2015 | Wooden | |
| 2015/0106168 | A1* | 4/2015 | Grossberg | G07C 13/00 705/12 |
| 2015/0186900 | A1* | 7/2015 | Bubeck | G06Q 50/265 705/317 |
| 2016/0104116 | A1* | 4/2016 | Greenberg | G06Q 10/105 705/320 |
| 2016/0232636 | A1* | 8/2016 | Wayne | G06Q 30/018 |
| 2017/0324805 | A1* | 11/2017 | Charan | G06F 16/29 |
| 2017/0329991 | A1* | 11/2017 | Van Dyne | G06F 16/2372 |

* cited by examiner

COMPUTER-IMPLEMENTED INFRASTRUCTURE, METHODS, SYSTEMS, AND COMPUTER-READABLE MEDIA FOR GENERATING AND MANAGING PRODUCT LABELS FOR A PRODUCT ACROSS A PLURALITY OF JURISDICTIONS

CROSS-REFERENCE TO RELATED APPLICATION

This application is a continuation of U.S. patent application Ser. No. 16/317,182, filed Jan. 11, 2019, which is a '371 National Stage Entry of PCT/US17/41864, filed Jul. 13, 2017, which claims priority to U.S. Provisional Application No. 62/361,874, filed on Jul. 13, 2016, and U.S. Provisional Application No. 62/393,663, filed on Sep. 13, 2016, all of which are incorporated herein by reference in their entireties.

BACKGROUND OF THE INVENTION

Regulated products such as pharmaceuticals are subject to varying legal and regulatory frameworks across a plurality of jurisdictions. Although the underlying product almost always contains the same active pharmaceutical ingredient across jurisdictions, and product labels usually contain at least some language in common across jurisdictions, the particular text of the label is subject to approval by individual regulatory authorities and often divergent requirements. Conventional word processing, spreadsheet, and/or document management systems have proved ineffective in managing such labels across a plurality of jurisdictions.

SUMMARY OF THE INVENTION

In one embodiment, a computer-implemented method of updating a product label, includes the steps of selecting a master label or jurisdiction product label associated with a labeled product, entering at least one change to information contained in a section of the master label or jurisdiction product label, qualifying the at least one information change via selection of at least one descriptor from a first pre-defined descriptor set, selecting a label for the labeled product, entering at least one change to information contained in the label that is commensurate with the information change in the master label or jurisdiction product label, qualifying the at least one information change in the label via selection of at least one descriptor from a second pre-defined descriptor set, and generating a report of the at least one label change including the changed label and a summary including the selected descriptors from the first and second pre-defined descriptor sets. In one embodiment, the first descriptor set includes pre-defined selectable options from at least one category from the group consisting of Change Rationale, Safety Change, and Change Type. In one embodiment, the pre-defined selectable options under the Change Type category include an urgency level. In one embodiment, the pre-defined selectable options under the Change Type category include an identification of mandatory, optional or administrative. In one embodiment, the second descriptor set includes pre-defined selectable options pertaining to the alignment of the information change in the label to the information change in the company core data sheet. In one embodiment, the pre-defined selectable options are from the group consisting of Major Deviation, Minor Deviation, and Aligned.

In one embodiment, a system for generating product label changes includes a product labeling platform executable on a network enabled computing device, and a database of at least one selectable master label and at least one selectable jurisdiction label associated with a labeled product, where the platform associates at least one selected descriptor from a first pre-defined descriptor set to each change made to a selected master label, and further associates at least one selected descriptor from a second pre-defined descriptor set to each change made to a selected jurisdiction label, and where the platform further associates a report including the selected descriptors from the first and second pre-defined descriptor sets with the changed label. In one embodiment, the first descriptor set includes pre-defined selectable options from at least one category from the group consisting of Change Rationale, Safety Change, and Change Type. In one embodiment, the pre-defined selectable options under the Change Type category include an urgency level. In one embodiment, the pre-defined selectable options under the Change Type category include an identification of mandatory, optional or administrative. In one embodiment, the second descriptor set includes pre-defined selectable options pertaining to the alignment of the information change in the label to the information change in the company core data sheet. In one embodiment, the pre-defined selectable options are from the group consisting of Major Deviation, Minor Deviation, and Aligned.

In one embodiment, a computer-implemented method of generating and managing product labels for a product across multiple jurisdictions, the computer-implemented method includes the steps of generating a master label for the product by presenting a first graphical user interface including multiple master template headers defined by a master template, and corresponding master label fields for input of master label content associated with the master template headers, receiving master label input to the corresponding master label fields via the first graphical user interface, and storing the master label content input in a master label data structure, and upon receiving a request to generate a jurisdiction-specific product label for the product for the particular jurisdiction, presenting a second graphical user interface including: multiple master template headers defined by the master template, corresponding master label content stored in the master label data structure, multiple jurisdiction template headers defined by a jurisdiction template, and corresponding jurisdiction-specific product label fields for input of jurisdiction-specific product label content associated with the jurisdiction-specific product label headers, allowing a user to select and modify portions of the master label content to populate the jurisdiction-specific product label fields, receiving jurisdiction-specific product label input to the corresponding jurisdiction-specific product label fields via the second graphical user interface, and storing the jurisdiction-specific product label input in a jurisdiction-specific product label data structure. In one embodiment, the master label data structure includes references to master template headers from the master label data structure, and modified master label headers. In one embodiment, the jurisdiction-specific product label data structure includes references to jurisdiction template headers from the jurisdiction template, modified jurisdiction label headers, references to unmodified label elements from the master label data structure, and modified label elements relative to the master label data structure. In one embodiment, at least one of the master label data structure and the jurisdiction-specific product label data structure includes metadata or references to metadata selected from the group consisting of:

supporting documents, change tracking data, labeling code, establishment information, drug listing, and workflow data. In one embodiment, the master label data structure and the jurisdiction-specific product label data structure are implemented in a database. In one embodiment, the database is a relational database. In one embodiment, the master label data structure and the jurisdiction-specific product label data structure contain references to a database. In one embodiment, the computer-implemented method includes presenting the master label or the jurisdiction-specific product label to one or more users for review, QC, or approval based on a workflow specified in computer-readable media. In one embodiment, the computer-implemented method includes tracking the review, QC, or approval of the master label or the jurisdiction-specific product label in computer-readable media. In one embodiment, the computer-implemented method includes generating a report detailing the tracked review, QC, and approval of the master label or the jurisdiction-specific product label. In one embodiment, the second graphical user interface displays the master label and the jurisdiction-specific product label side-by-side. In one embodiment, the second graphical user interface is further configured to synchronize positioning of the master label and the jurisdiction-specific product label such that corresponding sections of the master label and the jurisdiction-specific product label are substantially vertically aligned. In one embodiment, the corresponding sections are identified independent of text contained therein. In one embodiment, the computer-implemented method includes receiving a request to change a portion of at least one of the master label and the jurisdiction-specific product label, and prompting the user to qualify the requested change by selecting at least one descriptor from a pre-defined descriptor set including one or more selected from the group consisting of: a change rationale, a safety change, a change type, alignment to a source label, and label deadlines. In one embodiment, the computer-implemented method includes tracking the requested changes, and generating a report of changes, the report including the at least one descriptor selected from the pre-defined descriptor set, a status of an anticipated change to a label, a status of a changed label, and a summary of the changes. In one embodiment, the change rationale metadata requires identification of a reason for the change. In one embodiment, the reason for the change can include one or more selected from the group consisting of: "new data", "health authority request", and "update to source label". In one embodiment, the "change type" metadata requires identification of the change selected from the group consisting of: "urgent", "non-urgent", "mandatory", "optional", and "administrative". In one embodiment, the "alignment to source label" metadata requires identification of a degree of the change in relationship to a source label and selected from the group consisting of: "major deviation", "minor deviation", and "aligned". In one embodiment, the "label deadlines" metadata requires identification of a deadline for implementation of the change. In one embodiment, the "label deadlines" metadata further comprises identification of compliance to the identified deadline for implementation of the change. In one embodiment, the identification of compliance is selected from the group consisting of: "compliant", "not applicable", and "delegated". In one embodiment, the at least one descriptor is implemented in the database and is associated with the respective master label data structure or jurisdiction-specific product label data structure as implemented in the database.

In one embodiment, a system for generating and managing product labels for a product across multiple jurisdictions includes a computer including a storage device including a database management system, and a computer-readable program code including steps for generating a master label for the product by presenting a first graphical user interface including multiple master template headers defined by a master template stored, at least in part, in the database management system, and corresponding master label fields for input of master label content associated with the master template headers, receiving master label input to the corresponding master label fields via the first graphical user interface, and storing the master label content input in a master label data structure at least in part in the database management system, and upon receiving a request to generate a jurisdiction-specific product label for the product for the particular jurisdiction, presenting a second graphical user interface including the multiple master template headers defined by the master template and stored, at least in part, in the database management system, corresponding master label content stored in the master label data structure stored, at least in part, in the database management system, multiple jurisdiction template headers defined by a jurisdiction template stored, at least in part, in the database management system, and corresponding jurisdiction-specific product label fields for input of jurisdiction-specific product label content associated with the jurisdiction-specific product label headers, allowing a user to select and modify portions of the master label content to populate the jurisdiction-specific product label fields, receiving jurisdiction-specific product label input to the corresponding jurisdiction-specific product label fields via the second graphical user interface, and storing the jurisdiction-specific product label input in a jurisdiction-specific product label data structure at least in part in the database management system. In one embodiment, the computer is a networked computer. In one embodiment, the master label data structure includes references to master template headers from the master label data structure, and modified master label headers. In one embodiment, the jurisdiction-specific product label data structure includes references to jurisdiction template headers from the jurisdiction template, modified jurisdiction label headers, references to unmodified label elements from the master label data structure, and modified label elements relative to the master label data structure. In one embodiment, at least one of the master label data structure and the jurisdiction-specific product label data structure includes metadata or references to metadata selected from the group consisting of: supporting documents, change tracking data, labeling code, establishment information, drug listing, and workflow data. In one embodiment, the master label data structure and the jurisdiction-specific product label data structure are implemented in a database.

In one embodiment, the database is a relational database. In one embodiment, the master label data structure and the jurisdiction-specific product label data structure contain references to a database. In one embodiment, the computer-readable program code further includes steps for presenting the master label or the jurisdiction-specific product label to one or more users for review, QC, or approval based on a workflow specified in computer-readable media.

In one embodiment, the computer-readable program code further includes steps for tracking the review, QC, or approval of the master label or the jurisdiction-specific product label in computer-readable media. In one embodiment, the computer-readable program code further includes steps for generating a report detailing the tracked review, QC, and approval of the master label or the jurisdiction-specific product label. In one embodiment, the second graphical user interface displays the master label and the jurisdiction-specific product label side-by-side. In one embodiment, the second graphical user interface is further configured to synchronize positioning of the master label and the jurisdiction-specific product label such that corresponding sections of the master label and the jurisdiction-specific product label are substantially vertically aligned. In one embodiment, the corresponding sections are identified independent of text contained therein. In one embodiment, the computer-readable program code further includes steps for receiving a request to change a portion of at least one of the master label and the jurisdiction-specific product label, and prompting the user to qualify the requested change by selecting at least one descriptor from a pre-defined descriptor set including one or more selected from the group consisting of: a change rationale, a safety change, a change type, alignment to a source label, and label deadlines. In one embodiment, the computer-readable program code further includes steps for tracking the requested changes, and generating a report of changes, the report including the at least one descriptor selected from the pre-defined descriptor set, a status of an anticipated change to a label, a status of a changed label, and a summary of the changes. In one embodiment, the change rationale metadata requires identification of a reason for the change. In one embodiment, the reason for the change can include one or more selected from the group consisting of: "new data", "health authority request", and "update to source label". In one embodiment, the "change type" metadata requires identification of the change selected from the group consisting of: "urgent", "non-urgent", "mandatory", "optional", and "administrative". In one embodiment, the "alignment to source label" metadata requires identification of a degree of the change in relationship to a source label and selected from the group consisting of: "major deviation", "minor deviation", and "aligned". In one embodiment, the "label deadlines" metadata requires identification of a deadline for implementation of the change. In one embodiment, the "label deadlines" metadata further comprises identification of compliance to the identified deadline for implementation of the change. In one embodiment, the identification of compliance is selected from the group consisting of: "compliant", "not applicable", and "delegated". In one embodiment, the at least one descriptor is implemented in the database and is associated with the respective master label data structure or jurisdiction-specific product label data structure as implemented in the database.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
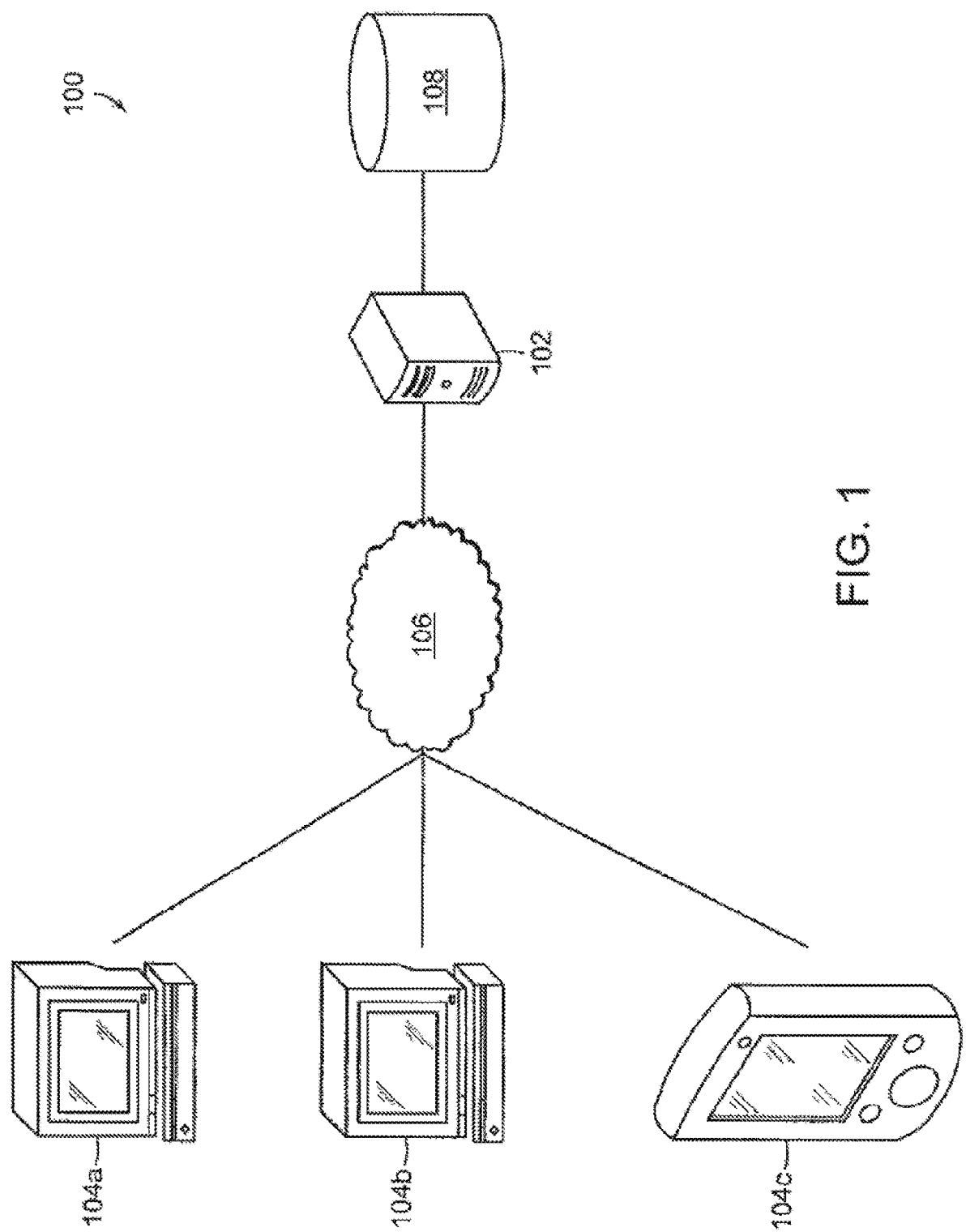
FIG. 1 depicts an exemplary network topology according to an embodiment of the invention.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or BD, or other type of device for electronic data storage.

As used in the specification and claims, the term "jurisdiction" refers to a "geographic area within which political or judicial authority may be exercised" and/or a "political or judicial subdivision within such an area". *Black's Law Dictionary* 855 (7th ed. 1999) (Bryan A. Garner ed.). Examples of jurisdictions include supranational (e.g., politico-economic) unions such as the European Union, sovereign states such as Germany or the United States of America, and political subdivisions thereof such as the Commonwealth of Pennsylvania or the City of Philadelphia.

Unless specifically stated or obvious from context, the term "or," as used herein, is understood to be inclusive.

As used herein, the term "processor" broadly refers to and is not limited to a single- or multi-core processor, a special-purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Embodiments of the invention provide computer-implemented methods, computer-readable media, and systems for generating and managing product labels for one or more products across a plurality of jurisdictions.

Embodiments of the invention are particularly useful for regulated products such as pharmaceuticals that are subject to varying legal and regulatory frameworks across a plurality of jurisdictions. For example, embodiments of the invention provide and implement documented and controlled methods for processes that exceed the capabilities of existing multiple word processing and spreadsheet applications.

Exemplary Network Topology

Referring to FIG. 1, an exemplary network topology 100 for an embodiment of the invention described herein is depicted. Embodiments of the invention can be implemented on server 102, which is in communication with clients 104a-c via network 106.

The terms "client" and "server" are used to reflect a client-server relationship between elements 102 and 104a-104c. Suitable devices for server element 102 include, but are not limited to general-purpose computers including, but not limited to, computers and/or devices with higher processing power colloquially known as "servers." Likewise, suitable devices for client elements 104a-104c include, but are not limited to general purpose computers, including, but not limited to desktop computers, laptop computers, tablet computers, personal digital assistants, cellular telephones, smartphones, and the like.

Network 106 can be any network capable of transmitting data between clients 104a-104c and server 102, for example, an intranet or the Internet.

The server 102 can be in communication with a database 108. Database 108 can be operated through a database management system (DBMS). A DBMS is imposed upon the data to form a logical and structured organization of the data. A DBMS lies between the physical storage of data and the users, and handles the interaction between the two. Examples of DBMSes include DB2® and INFORMIX®, both available from IBM Corp. of Armonk, N.Y.; MICROSOFT EXCEL®, MICROSOFT JET®, and MICROSOFT SQL SERVER®, all available from the Microsoft Corp. of Redmond, Wash.; MYSQL®, available from the MySQL Ltd. Co. of Stockholm, Sweden; ORACLE® Database, available from Oracle Intl Corp. of Redwood City, Calif.; and SYBASE®, available from Sybase, Inc. of Dublin, Calif.

Depending on the particular implementation, server 102 and/or clients 104a-c can be programmed to generate and/or display one or more graphical user interfaces that allow users to interact with the server 104 through graphical icons and visual indicators. For example, server 102 and/or clients 104a-c can include charts or graphs (e.g., pie charts, bar charts, line charts, and the like) that can be generated on-the-fly using custom widgets or commercially-available widgets such as the GOOGLE® CHART API available from Google Inc. of Mountain View, Calif., the CorePlot, iOSPlot, iOS:Chart, KeepEdge Library, and Shinobi Controls graphing libraries for the IOS® operating system from Apple Inc. of Cupertino, Calif., and the GraphView and AndroidPlot libraries for the ANDROID™ operating system from Google Inc. of Mountain View, Calif.

Although an exemplary network topology is described and depicted, embodiments of the invention can be implemented in a variety of topologies. For example, embodiments of the invention can be implemented as a "cloud" or "as a service" model in which a company purchases a subscription and accesses a service through the Internet (which may run on servers 102 in a variety of locations such as the AMAZON EC2® elastic repository service). In another embodiment, a company can license and host an embodiment of an invention on a server 102 owned by the company.

Exemplary Data Storage Framework

Figure 2:
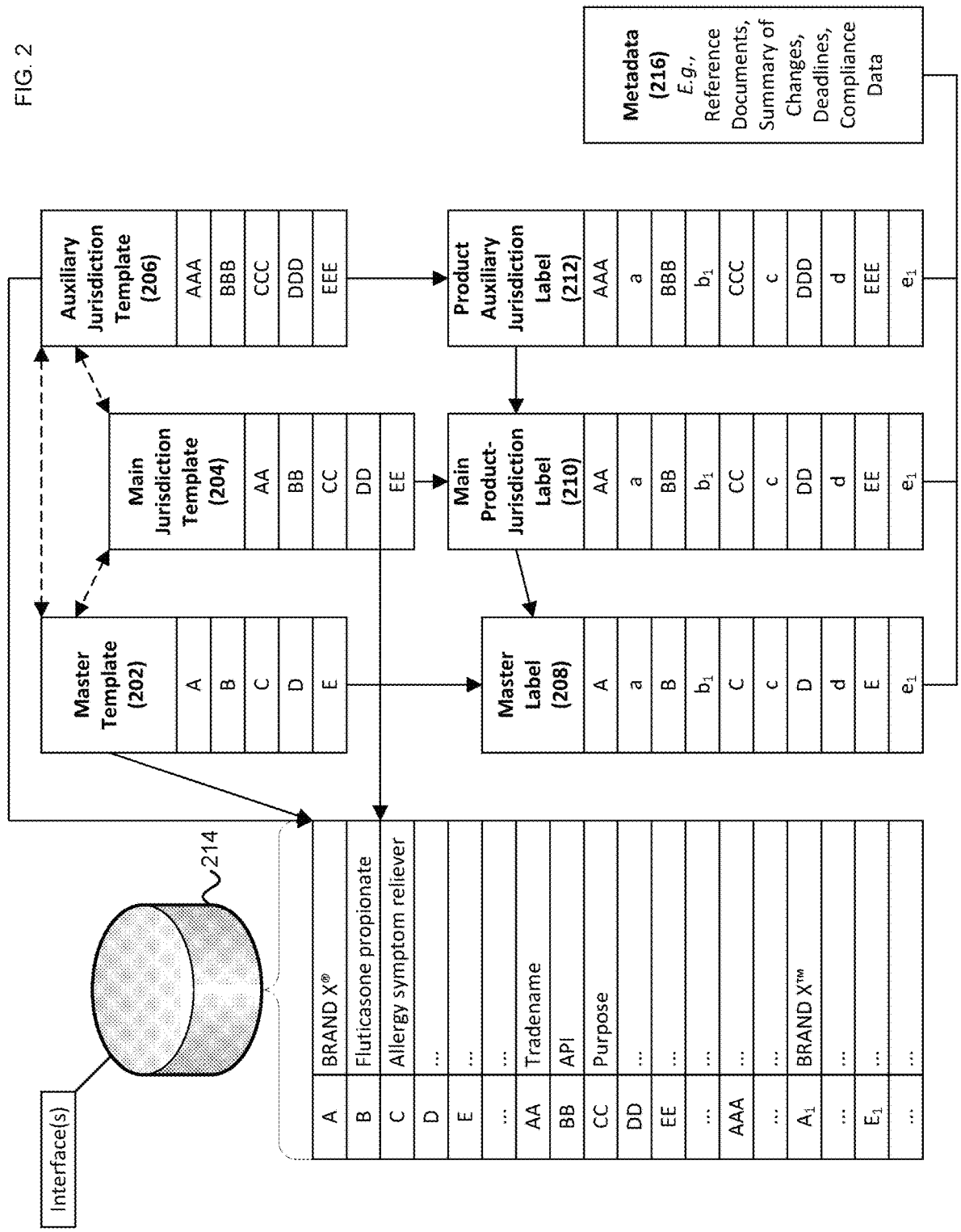
FIG. 2 depicts an exemplary framework for storing data according to an embodiment of the invention.

Referring now to FIG. 2, embodiments of the invention can structure, link, connect, and store data in a variety of formats. One exemplary approach is depicted.

A particular product label can be generated and/or represented through the combination of a plurality of templates: master label template 202 and jurisdiction templates 204, 206. Master label template 202 can provide a starting point for a particular master label 208 and jurisdiction templates 204, 206 can provide a starting point for a particular jurisdiction label 210 and/or 212 from which modifications can be made and/or tracked.

A master label 208 (also referred to herein as a Company Core Data Sheet (CCDS) label, but also encompassing main product jurisdiction labels such as United States Product Insert (USPI) or European Union Summary of Product Characteristics (EUSmPC)) can store basic information about the product that can be used to populate a particular downstream main product-jurisdiction label 210 and/or product auxiliary jurisdiction label 212. For example, in the pharmaceutical context, a master label 208 can include information about the trade name of the product, its qualitative and/or quantitative composition, medical product information, and the like. Such information is likely to be common across main product-jurisdiction labels 210 and/or or product auxiliary jurisdiction labels 212 to be generated. In one embodiment, when the user has completed adding their information to the CCDS, they can save their changes and the CCDS is automatically given a name. The naming convention in certain embodiments can be specific to the informational content and the state in which the product label is in, such as for example a version in draft, a version in review, a version pending internal approval, a version pending health authority approval (e.g. for local label only), or a version pending team review. This automatic naming convention helps to ensure that the documents are not mislabeled and that the components provided in the naming convention represent where it is in its workflow and life-cycle. The user can choose to upload and share the document as public, making it available to other users in the system, or they can choose to mark it as in-progress and save it as private for themselves. This saving and standard naming convention functionality can be performed at any step a save option is available, or whenever the user can create, edit, review and approve a document, including both local labels and the CCDS. In one embodiment, users can sign-off on documents by simply selecting an option to input their signature. The signature is populated by automatically pulling from a user profile page. Once all required users approve the document, the document will generate an effective date and the document will be locked as clean with an updated version. The user profile page is unique to individual users, and the user can update all of their user information, change their user image, upload a new signature, change their password or modify their settings from their profile page.

The templates, inclusive of master label template 202 and jurisdiction templates 204, 206, prove a framework for each respective label instance 208, 210, 212 and enable the structured authoring across label types accordingly. For example, sections with similar content across the templates 202, 204, 206 can be aligned with each other even though section headers may not be identical across master label template 204 and templates 206, 208.

A main jurisdiction template 204 can structure and store basic fields and/or information that are required for one or more jurisdictions. For example, the U.S. Food and Drug Administration may require different fields and/or a different format than the European Medicines Agency.

Finally, an auxiliary jurisdiction template 206 can provide specify further information unique to a particular type of label. For example, although a combination label and a patient information label may contain identical or very similar information in a particular jurisdiction, the labels may be formatted differently.

Information from master label template 202 and templates 204 or 206 can be combined to generate a particular downstream main product-jurisdiction label 210 and/or product auxiliary jurisdiction label 212 as will be further discussed herein.

In one embodiment, a system for generating product label changes includes a product labeling platform executable on a network enabled computing device, and a database of at least one selectable master label and at least one selectable jurisdiction label associated with a labeled product, where the platform associates at least one selected descriptor from a first pre-defined descriptor set to each change made to a selected master label, and further associates at least one selected descriptor from a second pre-defined descriptor set to each change made to a selected jurisdiction label, and where the platform further associates a report including the selected descriptors from the first and second pre-defined descriptor sets with the changed label. In one embodiment, the first descriptor set includes pre-defined selectable options from at least one category from the group consisting of Change Rationale, Safety Change, and Change Type. In one embodiment, the pre-defined selectable options under the Change Type category include an urgency level. In one embodiment, the pre-defined selectable options under the Change Type category include an identification of mandatory, optional or administrative. In one embodiment, the second descriptor set includes pre-defined selectable options pertaining to the alignment of the information change in the label to the information change in the company core data sheet. In one embodiment, the pre-defined selectable options are from the group consisting of Major Deviation, Minor Deviation, and Aligned.

Exemplary Method and Infrastructure for Creating and Managing a Product Label

Figure 3:
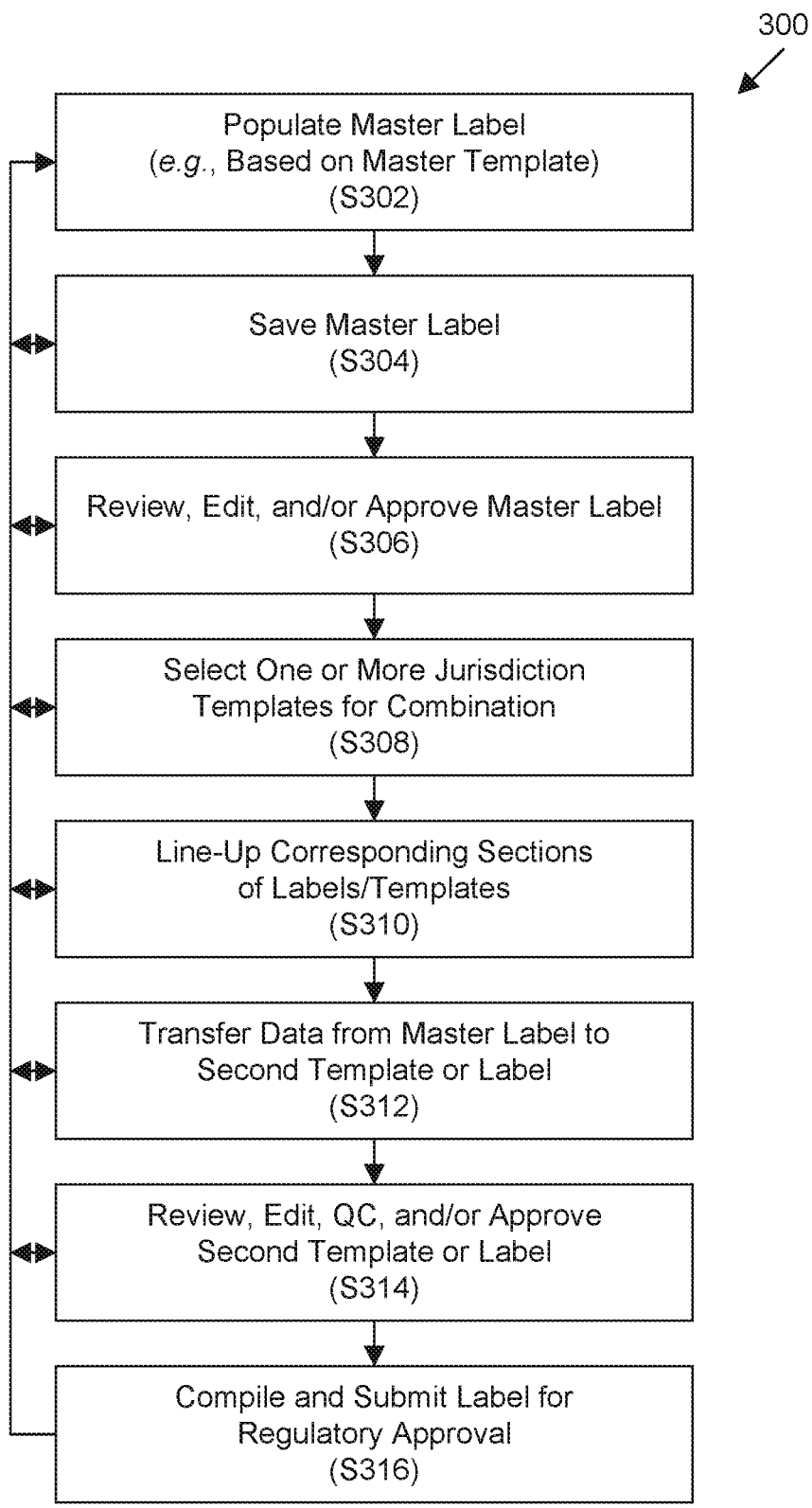
FIG. 3 depicts a method for creating and/or managing a product label according to an embodiment of the invention.

Referring now to FIG. 3, an exemplary method and infrastructure 300 for creating and managing a product label is depicted.

Figure 4A:
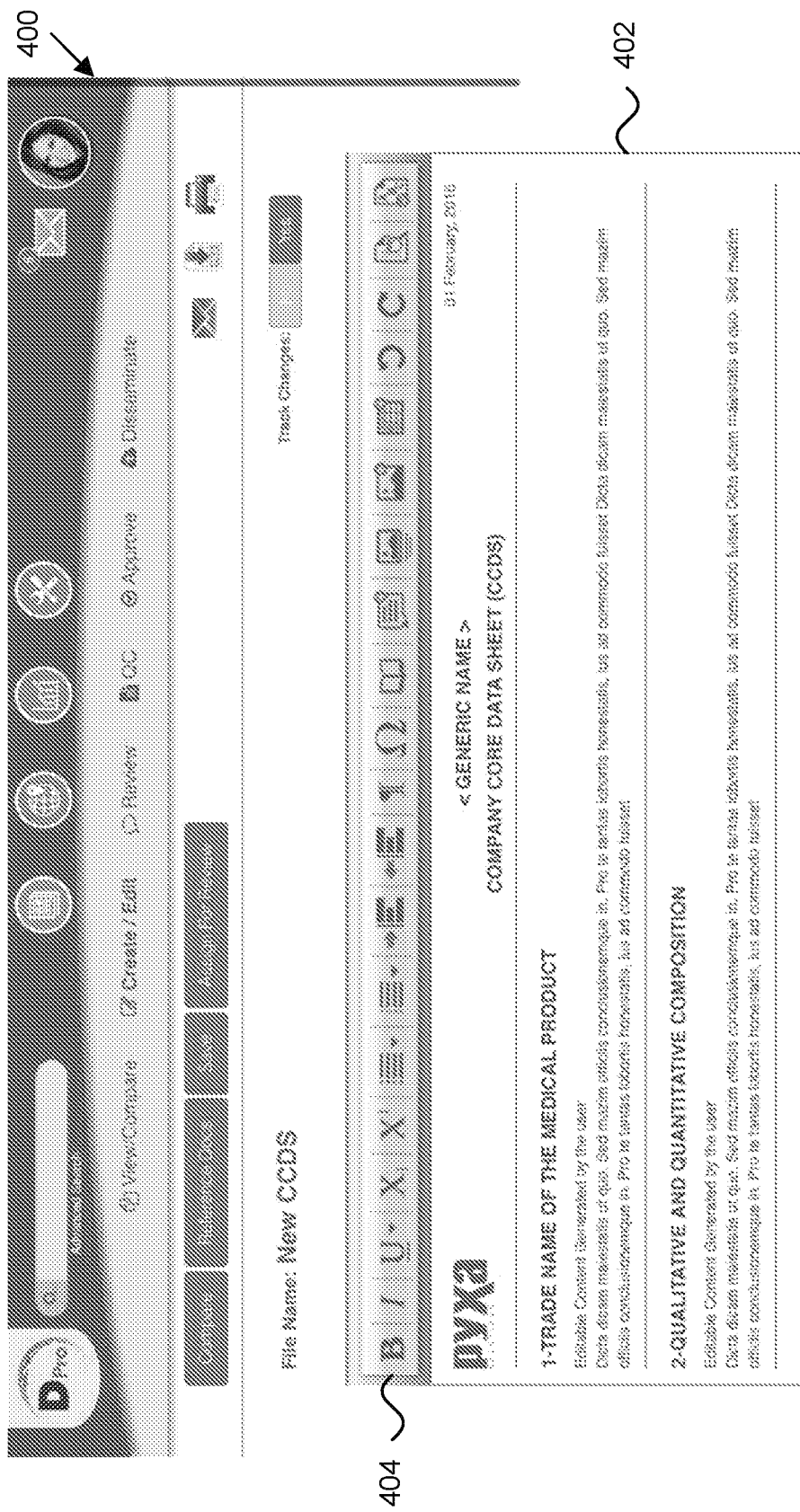
FIGS. 4A-4T depict various user interfaces according to an embodiment of the invention.

In step S302, a master label 208 is defined. As depicted in FIG. 4A, user interface 400 can include one or more text entry GUI widgets 402 programmed to receive textual (and/or graphic) input and display entered content. User interface 400 can also include one or more formatting GUI widgets 404 such as buttons that can allow a user to format text (e.g., as bold, italic, underlined, subscript, superscript, bulleted, numbered, indented, including equations, including photographs, including tables and the like). Ideally, the user interface 400 can provide a user interface that is familiar to users of common word processing applications.

The master label 208 can be populated from a master template 202 (e.g., provided as part of a software package). The master label 208 can include pre-defined section headers that can be tagged, e.g., to allow correlation across templates and labels or correlation of content within each section to the respective section header. The master template 202 can be modified within the system by the end user if desired.

Figure 4B:
Figure 4C:
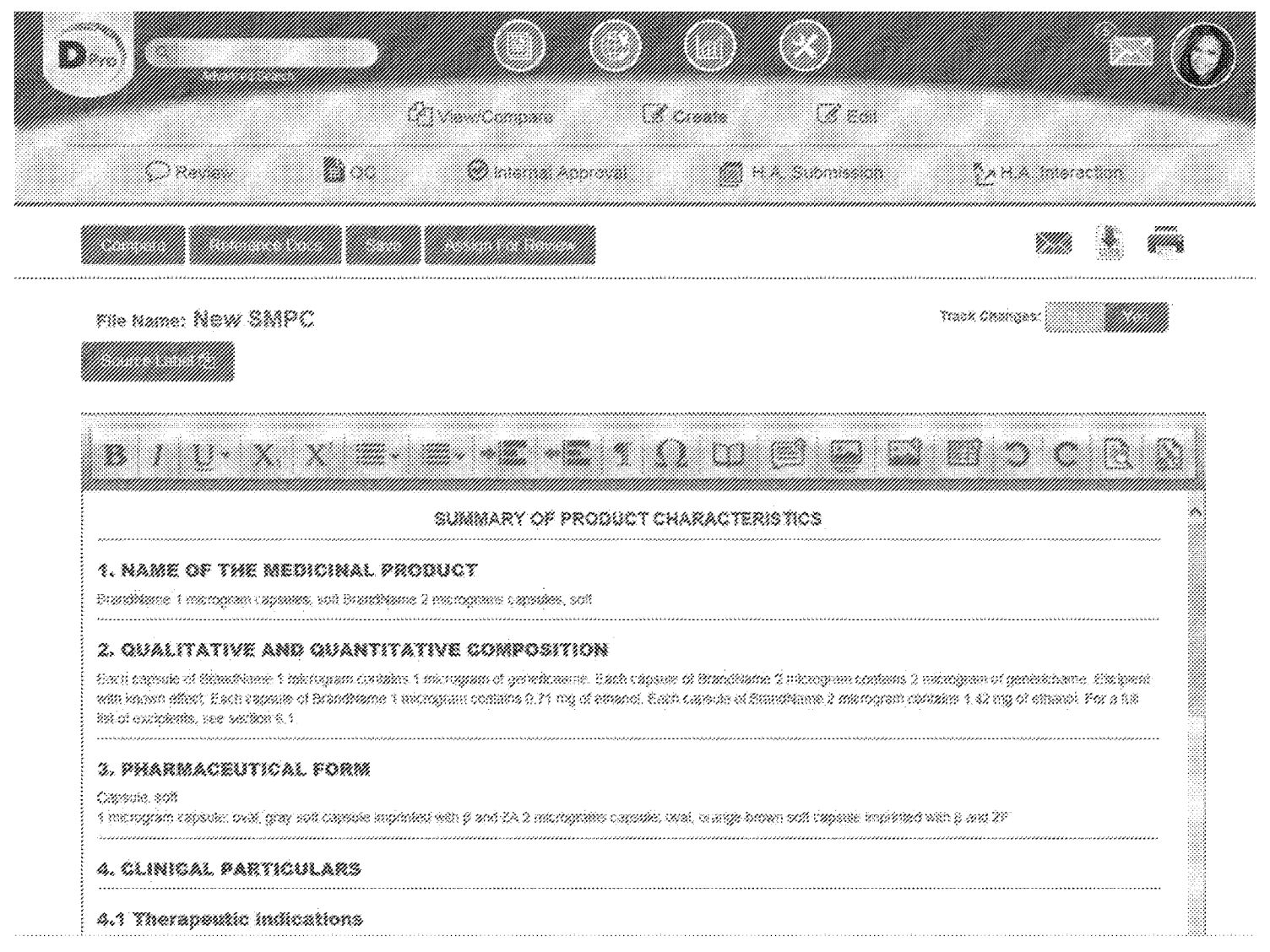

In step S304, the master label 208 is saved. The master label 208 can be saved in a variety of formats. In one embodiment, the master label 208 is saved in a single file (e.g., plain text .txt file, a Rich Text Format .rtf file, a HyperText Markup Language.html file, an Extensible Markup Language .xml file, a MICROSOFT® WORD-™.doc or .docx file, a specified health authority style template (e.g. FDA structured product label (SPL), and the like). In other embodiments, the content of the master label 208 is stored as discrete elements. The discrete elements can be tagged to a specific label and/or a section within the label as wells as other relevant metadata (e.g., product, therapeutic area, product indication, generic name, brand name, etc.) and can also be searched accordingly. FIG. 4Q depicts one of many ways to search on the discrete data elements. The discrete data elements can be referenced by a product template data structure and by other data structures. The discrete data elements can be also managed and/or tracked and/or reported and/or extracted as single or structured data elements to serve a multitude of functions, for example, to meet the requirements of required health authority data structures and governance (e.g., identification of medicinal products (IDMP)).

In some embodiments, the master label 208 is a structured document. In one embodiment, one or more tags denote various fields. For example, the master label 208 can be an XML file that includes the following data:

<tradename>BRAND X®</tradename>
<API>Fluticasone propionate (glucocorticoid) 50 mcg</API>
<purpose>Allergy symptom reliever</purpose>

In still another embodiment, the master label 208 can be stored as a data structure that contains references to a plurality of elements that can be stored separately. Referring again to FIG. 2, master label 208 can include references to elements A-E. Elements can include words, phrases, sentences, paragraphs, images, and the like. When master label 208 is accessed (e.g., for viewing, editing, and the like) elements A-E can be obtained from local or remote (e.g., cloud-based) disk or memory (e.g., a database 214) and presented as a single document.

In step S306, a user-defined revision and approval workflow can be implemented. For example, a company can specify that approvals from particular individuals are required for any new template, updates to a template, a new label, or any changes to a master label 208. Various workflow applications, libraries, and other existing techniques can be incorporated within embodiments of the invention. Exemplary workflow definition languages include XPDL, YAWL, and SCUFL. Exemplary workflow libraries and interfaces include Windows Workflow Foundation (WF), Workflow OSID, and Open WFE or can be provided as custom tools within the system.

As the master label 208 (and other templates and documents described herein) is reviewed and/or revised, revisions can be tracked in different versions. Version control can be managed through the system by automatically creating standard naming conventions with associated versions for each new and/or updated template and/or label in the system. For example, embodiments of the invention can implement version control for master label 208, templates 202, 204, 206, documents, and/or elements that can save and maintain multiple versions and metadata associated with the same. Revisions can be saved in database 214 and linked and/or associated with the respective version of the template 202, 204, 206 and/or label 208, 210, 212. In one embodiment, the system issues an automated naming convention to each product label each time it is developed or updated, and the naming convention specifies the state in which the product label is in. The state may include for example a version in draft, a version in review, a version pending internal approval, a version pending health authority approval (e.g. for local label only), or a version pending team review. In one embodiment, the naming convention is an additional tag to the product label and the tags are used for further tracking and reporting of product labels. The user can choose to make the document available to other users in the system, or they can choose to mark it as in-progress and save it as private for themselves.

In step S308, a user can select a master label 208 and one or more templates for viewing and transfer of data. The user can be presented with a variety of user interfaces such as that depicted in FIG. 4B to facilitate this selection. For example, various options within the Product, Country, Indication, Brand name, and Label Type categories can be associated with particular labels and/or templates.

Figure 4D:
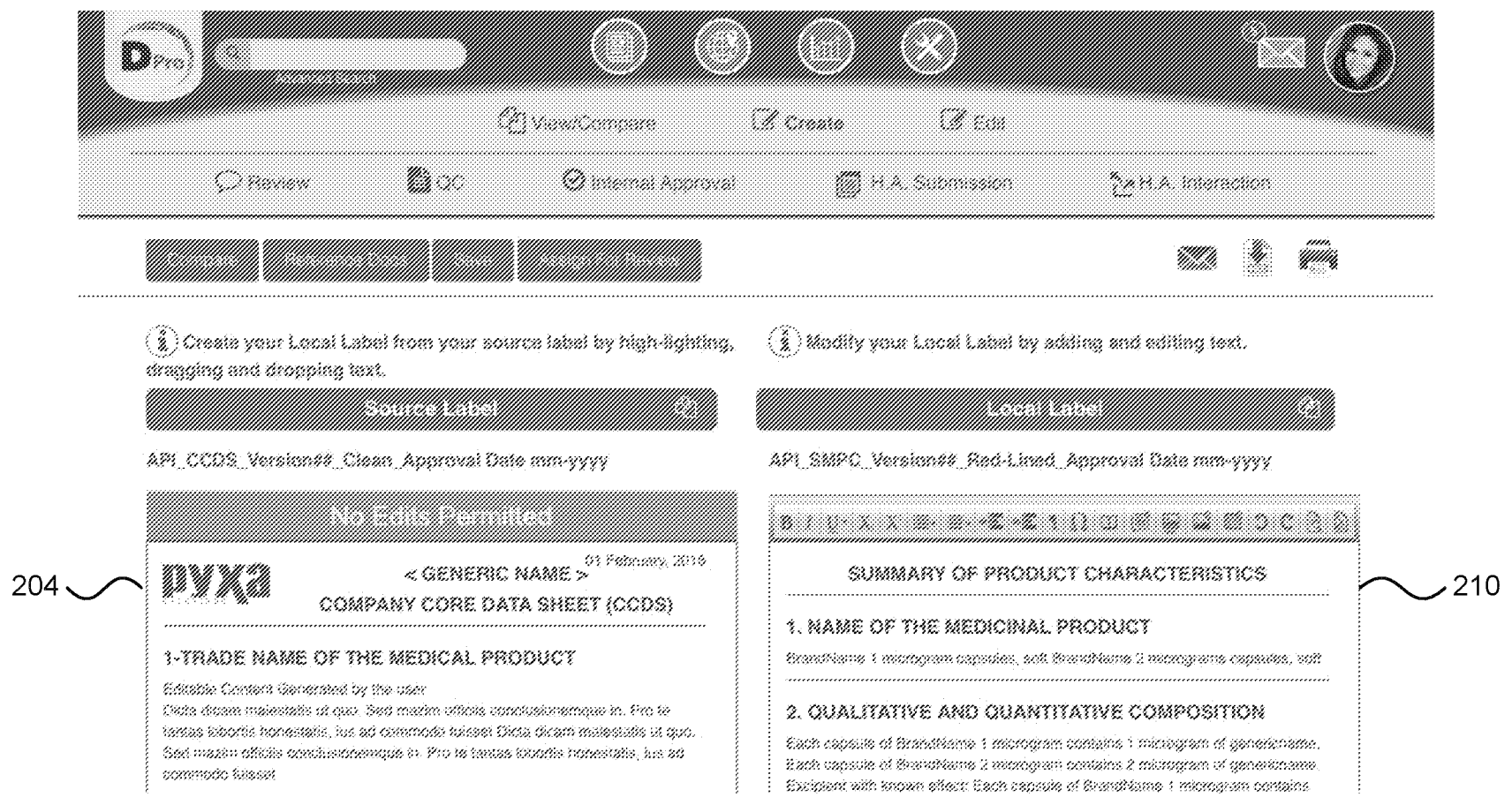

In step S310, corresponding sections of master label 208 and/or templates can be presented at the same or substantially the same vertical height and/or position in a user interface as depicted in FIG. 4D. This can be implemented using a variety of techniques. For example, in one embodiment, a GUI widget can be programmed to detect a height and/or position of the beginning of a section in one GUI widget and force an update to the same position in a second GUI widget, followed by a repaint. For example, tags across labels 202, 204, 206 and/or templates 208, 210, 212 can be associated such that even if the text of a heading differs across templates 202, 204, 206 and/or labels 208, 210, 212, corresponding sections will be displayed at the same or substantially the same height and/or position within the GUI widgets.

In step S312, data is transferred from a master label 208 or first template to a second label or template. For example, data from a master label 208 can be transferred to create a main product-jurisdiction label 210 for a particular product in a particular jurisdiction or can be transferred to create a product auxiliary jurisdiction label 212. Furthermore, a main product-jurisdiction label 210 can then be combined with an auxiliary jurisdiction template 206 as will be discussed herein to produce a product auxiliary jurisdiction label 212.

Data can be transferred between labels 208, 210, 212 and templates 202, 204, 206 in a variety of manners. In one embodiment, associations are defined with elements or fields of the master label 208 so that individual fields (e.g., tradename, API, and the like) in the master label 208 can be mapped directly to an appropriate field defined by the jurisdiction templates 204, 206. In other embodiments and as depicted in FIG. 4D, master label 208 and main product-jurisdiction label 210 can be displayed (e.g., side-by-side) in a GUI and the user can select content for transfer between labels and/or templates. For example, the user can select one or more elements for transfer, select particular portions of an element (e.g., through copying and pasting), drag-and-drop particular elements, elect to transfer all data and then edit, and the like. Once the desired data is transferred, the user can then edit the data as needed.

In step S314, data is edited in the second label 208, 210, 212 or template 202, 204, 206. For example, a user may recognize that a particular regulatory agency requires certain language that is not required in other jurisdictions (and, thus, does not appear in the master template 202 and/or master label 208). The user can add this language in the second label and/or template. In another example, the user may recognize that the brand name may differ or require a different trademark symbol in a particular country. In the data model depicted in FIG. 2, this revision can be saved as a new element version and referenced using that version ID.

Figure 4E:
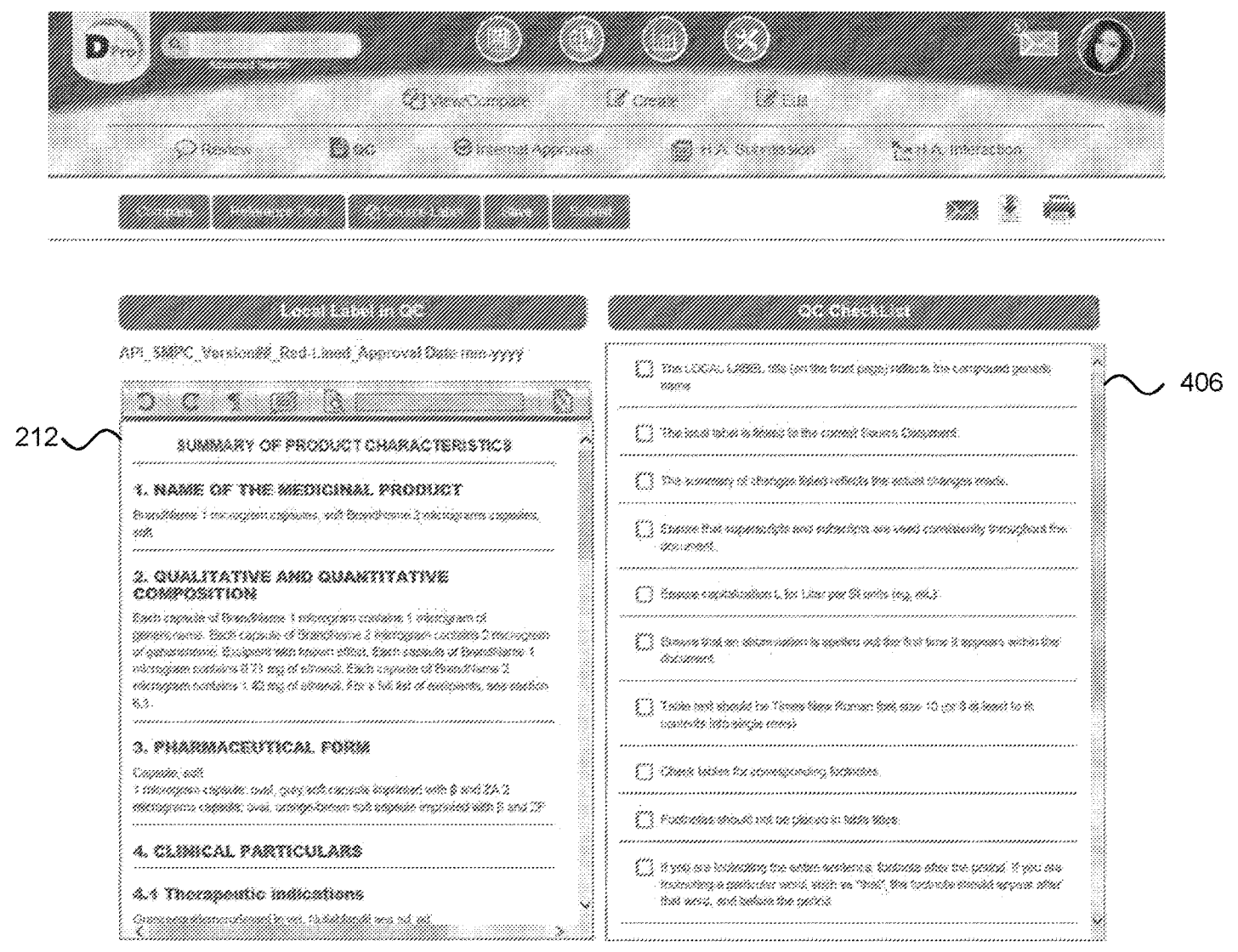

In step S314, quality control (QC) can be facilitated through a checklist 406 displayed alongside a label 212 as depicted in FIG. 4E. This feature can also apply to master label 208 and other templates and labels. The templated QC check-list can be provided as part of a software package and can be edited from the tools section of the system. All checklist items that have passed or failed the QC can be tracked and available for reporting, so that if the same error repeatedly occurs, the company can address it through training or other action to improve the quality of deliverables. Similar interfaces can be used for facilitating QC of master label 208 and labels 210, 212.

In step S314, further approvals of a particular label 212 can be implemented.

Figure 4F:
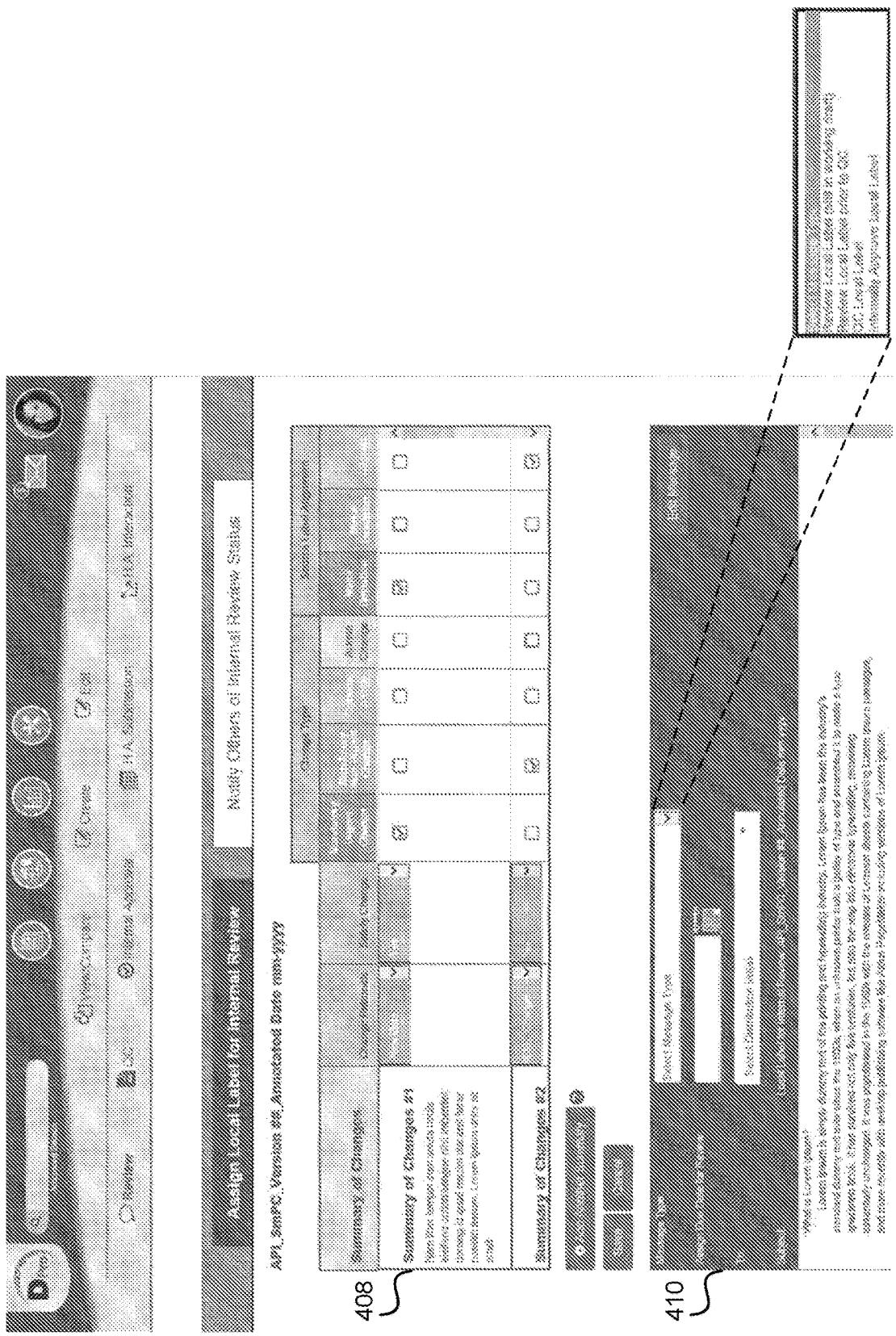

Changes to a label 208, 210, 212 can be tracked using a user interface such as that depicted in FIG. 4F (in the context of changes to a previously approved local label). Communication of changes and internal reviews can be facilitated through this notification system. GUI widget 408 can prompt a user to describe or "qualify" each change to a template or label by answering a series of questions that can be presented in drop-down, check-box, or other GUI widgets. For example, the user can provide a summary of changes and specify: a rationale for the change (e.g., new data), whether the change relates to safety, a change type (e.g., "mandatory urgent change", "mandatory non-urgent change", "optional change", "administrative change", and the like), and whether the change represents a major deviation, a minor deviation, or no change ("aligned") from a source label (e.g., master label 208). (Similar interfaces can be used for tracking changes to the master label 208, but will omit the "alignment" information). That data (summary of changes and associated qualifiers) can be linked to the respective label (e.g., metadata 216 in database 214 and/or other associated database in the system and can be aggregated (e.g., for one or more labels and across one or more labels) in reports such as those depicted in FIGS. 4O and 4P. No existing systems allow companies to automatically track and/or report changes, especially at a per-change level of granularity and tightly-coupled to the label and, specifically, across labels.

Once the user has completed the summary of changes with the associated qualifiers, the user can use GUI widget 410 to complete a message that can be distributed with the review, QC, and/or approval of a label 208, 210, 212. Embodiments of the invention can include "templated" messages that can be easily selected from a drop-down list, appear in the message box, and be edited before sending. These templated messages can be modified in a "Tools" or other administrative menu of a software program implementing embodiments of the invention. These templated messages advantageously promote inclusion of critical information that should be included in the message.

The user can also specify a deadline for review and a distribution list for the review request. The distribution lists can be modified "Tools" or other administrative menu of a software program implementing embodiments of the invention. Furthermore, the distribution lists can be imported from other systems (e.g., ACTIVE DIRECTORY®, MICROSOFT EXCHANGE SERVER®, OUTLOOK®, and/or SHAREPOINT®, software available from Microsoft Corporation of Redmond, Wash., a Lightweight Directory Access Protocol, and the like).

When the user hits the "Send" button, the relevant label and associated summary of changes table with all associated qualifiers along with the templated (edited) message can be sent to all those on the distribution list. They will receive the message in their "Deadlines" folder as depicted in FIG. 4N with the deadline date for review. The receiving party can note the action taken on the deadline (e.g., completed or waived) using a user interface (e.g., using GUI widgets 412 as depicted in FIG. 4M). Compliance to the date and action on that deadline can be tagged and linked to the respective label (metadata 216), stored in database 214 or other associated storage, tracked in the system and can be aggregated in reports such as those depicted in FIGS. 4O and 4P.

In step S316, compiling components of the label for regulatory submission can be facilitated and tracked as depicted in FIGS. 4G-4M. The "H.A. Submission" subpages depicted in FIGS. 4G-4M enable a user to enter additional information (metadata) required for submission of a label to a health authority (e.g., the U.S. Food and Drug Administration, the European Medicines Agency, and the like).

Figure 4G:
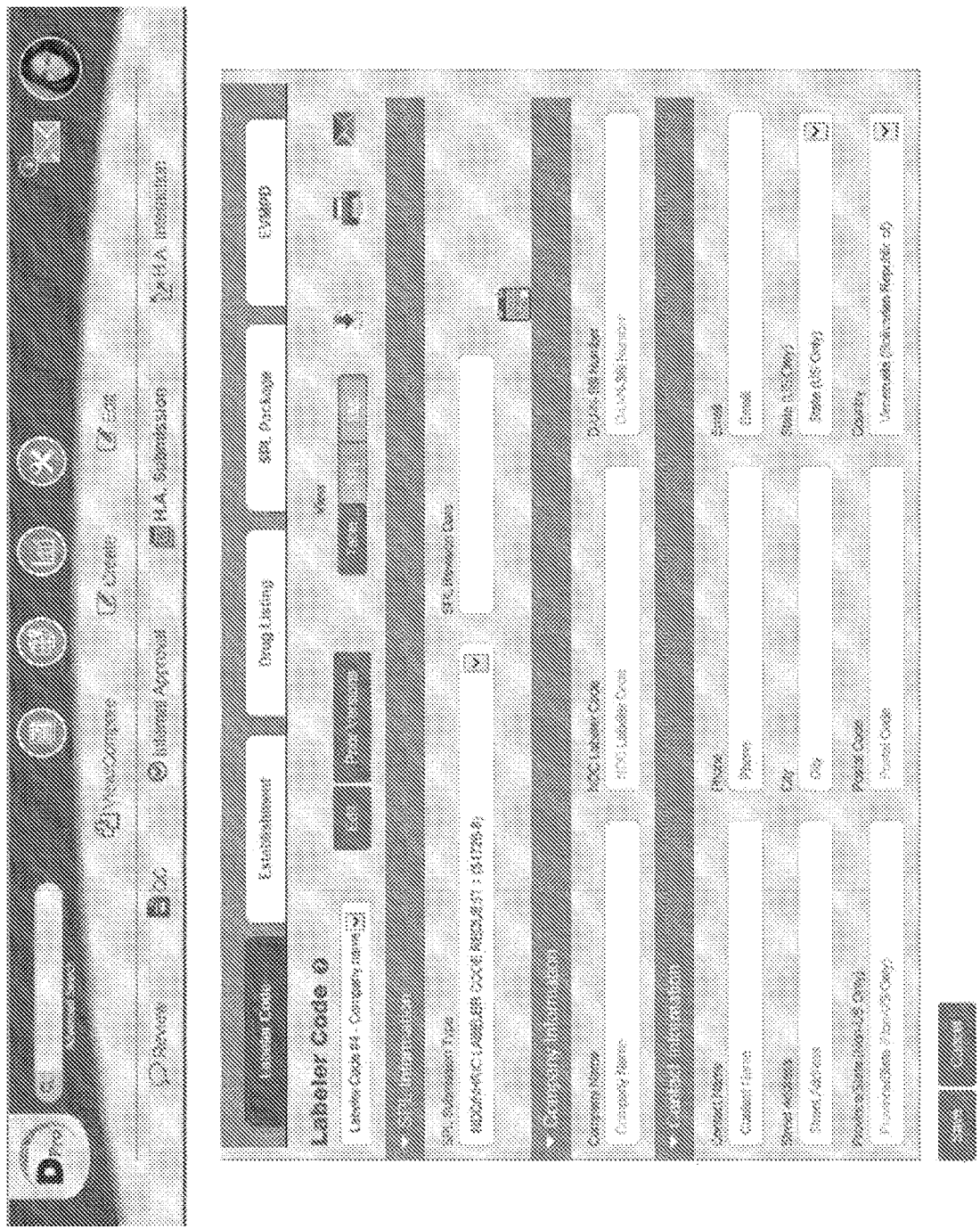
Figure 4H:
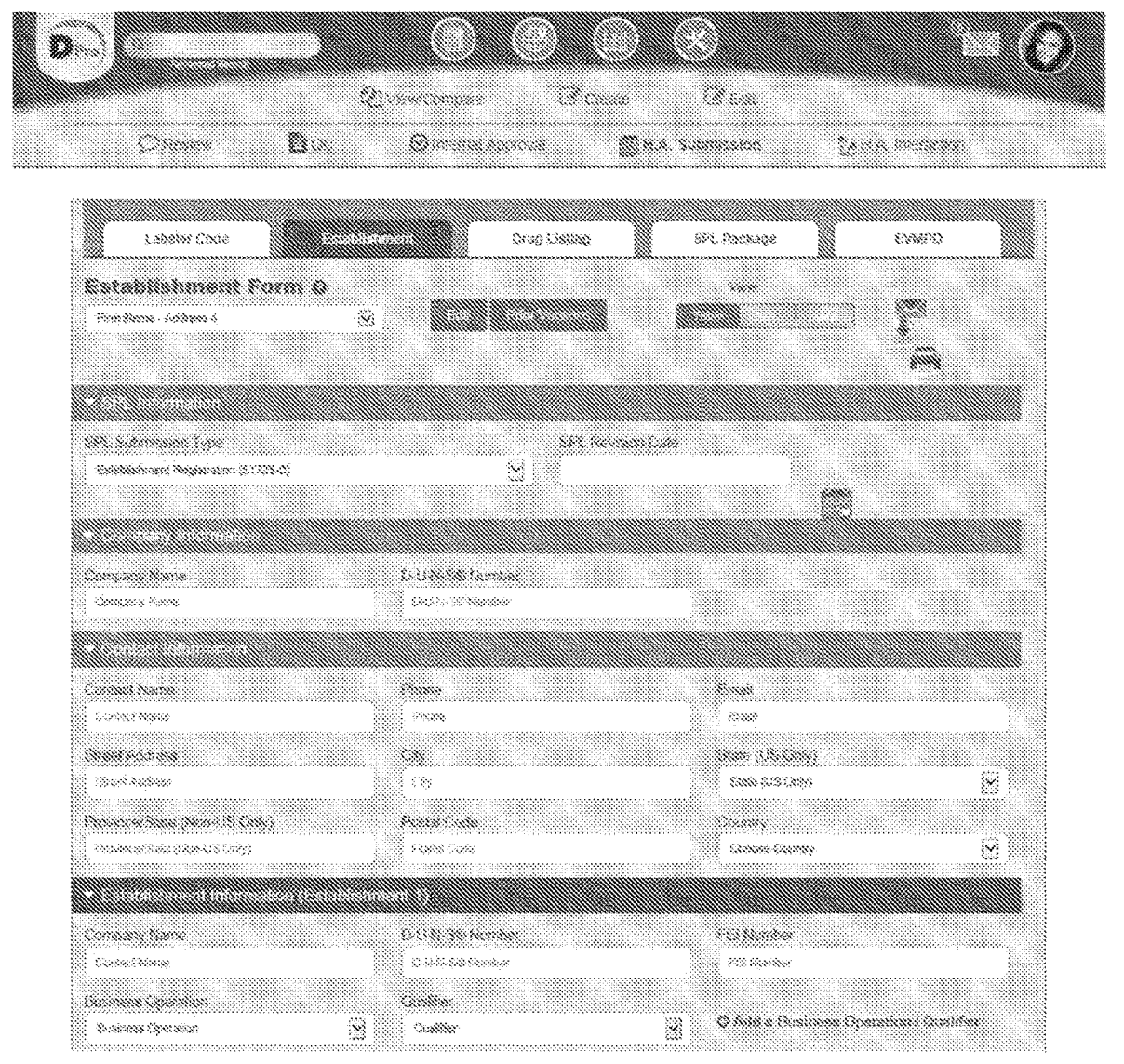
Figure 4I:
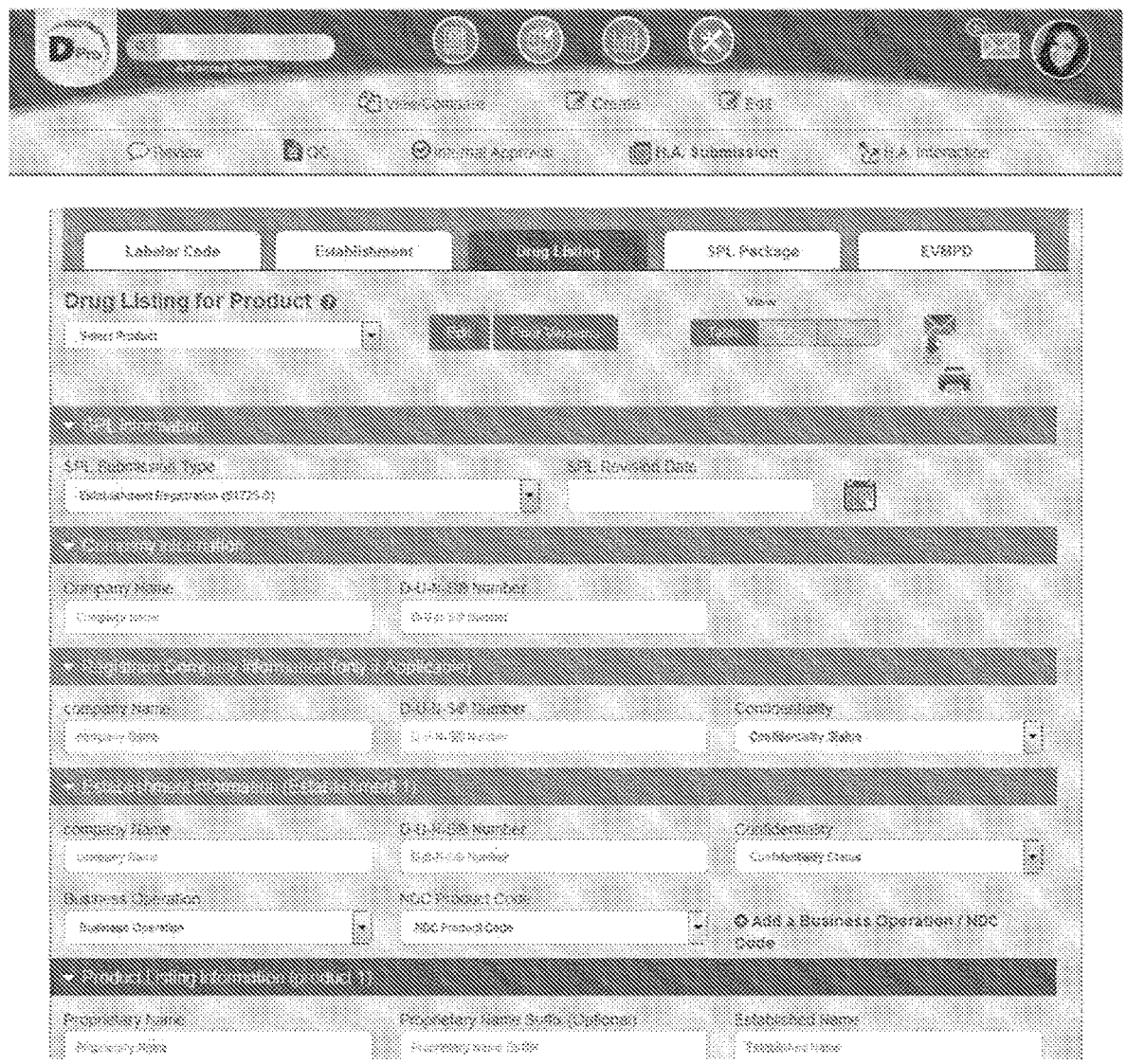

For example, the "Labeler Code" tab depicted in FIG. 4G, the "Establishment" tab depicted in FIG. 4H, and the "Drug Listing" tab depicted in FIG. 4I allows for collection of information required by the relevant health authority and can be tailored to reflect one or more individual health authorities. Information entered once in the system for another product (and/or relevant label) becomes available to other users in a dropdown list so that they can select it for future submissions, thus saving time for repeated re-entry of the same information. This information can be stored in a database 214 as depicted in FIG. 2 or other data structure. This information can be tagged to the respective product and/or label and can be searched, reported, and/or extracted accordingly.

The information entered into the system (and stored in database 214) can be automatically converted to XML and/or SPL (structured product labeling) and/or EVMPD (EudraVigilance Medicinal Product Dictionary), which is the format required by many health authorities. This automatic conversion streamlines the process of creating the SPL for submission to the H.A.

Figure 4J:
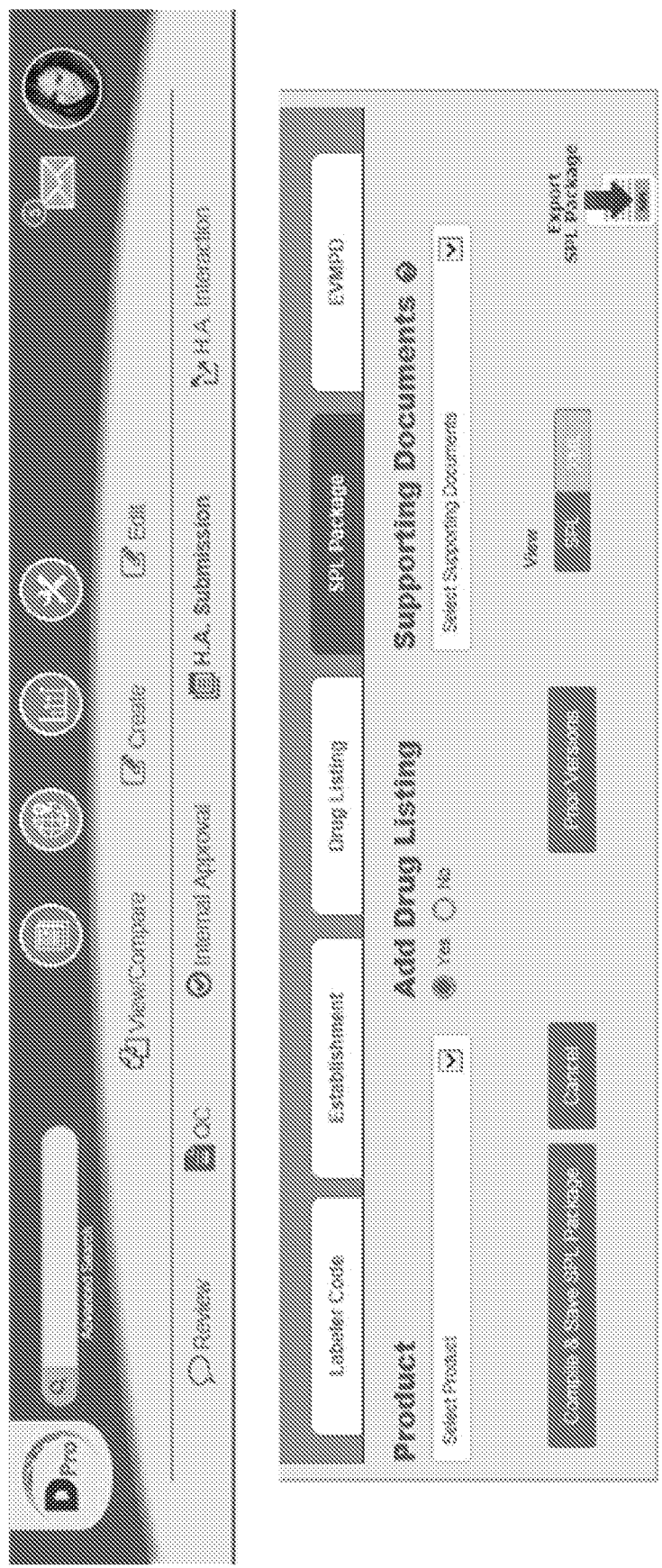

Because all the label and associated metadata can reside in the same database, extracting a label submission package, SPL, EVMPD, and the like is as efficient as selecting the data required for the submission and extracting the information in the correct format according. For example, FIG. 4J depicts the "SPL Package" tab of the "H.A. Submission" subpages. The user can select the product for which they are compiling the submission. The user can select whether or not to include the drug listing information. The labeler code information and the establishment information can always be included. The user can select any other information that they want to include in the submission package. The user can press the "Compile & Save SPL Package" button to pull the correct local label (content as entered previously in the system and format as specified by the template), the labeler code information, the establishment code information, the drug listing information (if selected as required), and compile everything into the SPL format to be submitted to the H.A. The user can then export the SPL package for submission to the H.A. Additionally or alternatively, the system can also be linked directly to a portal for submission of the SPL package to the H.A. (e.g., through an application program interface (API)) so that the user does not need to leave the system environment for submission.

Figure 4K:
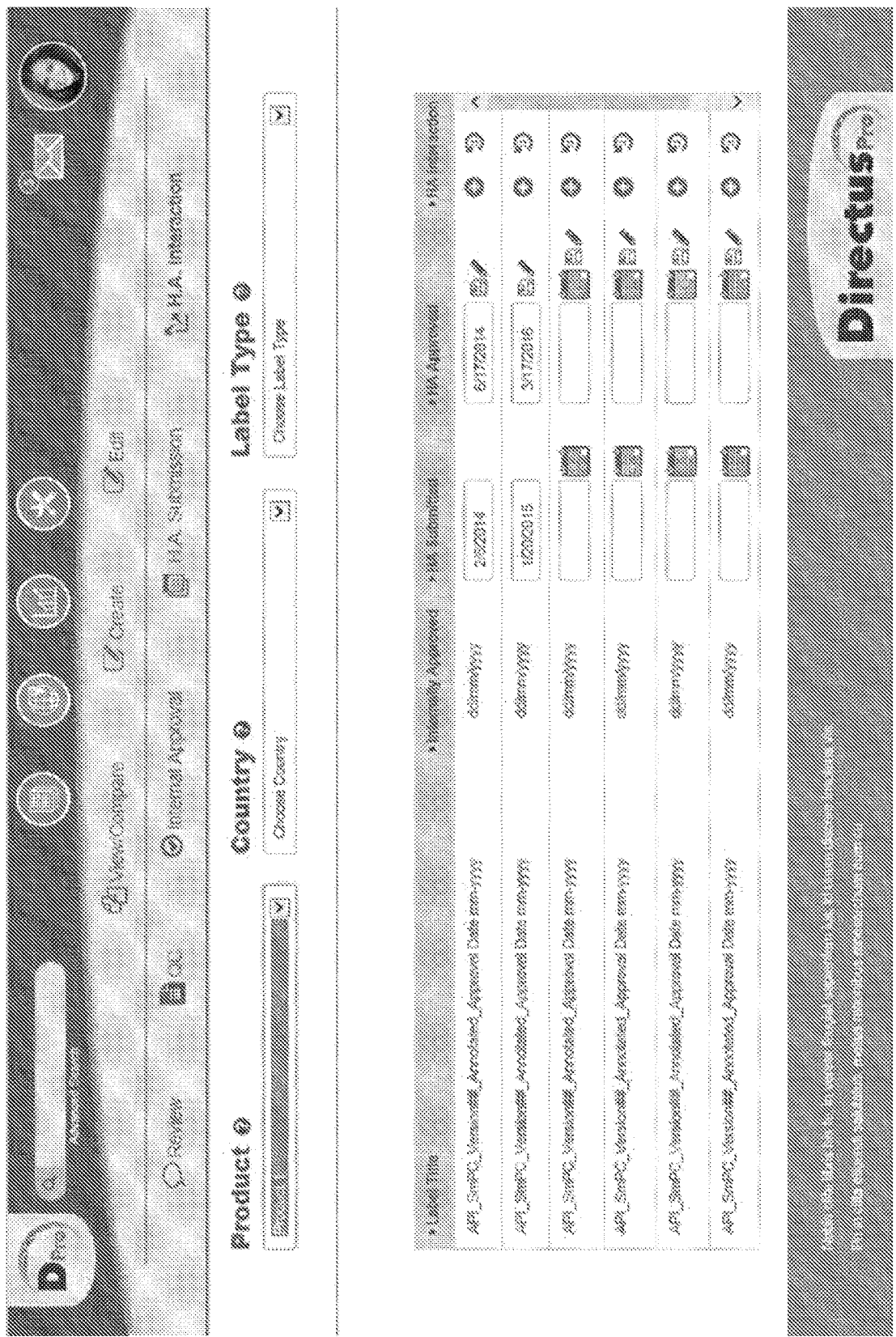
Figure 4L:
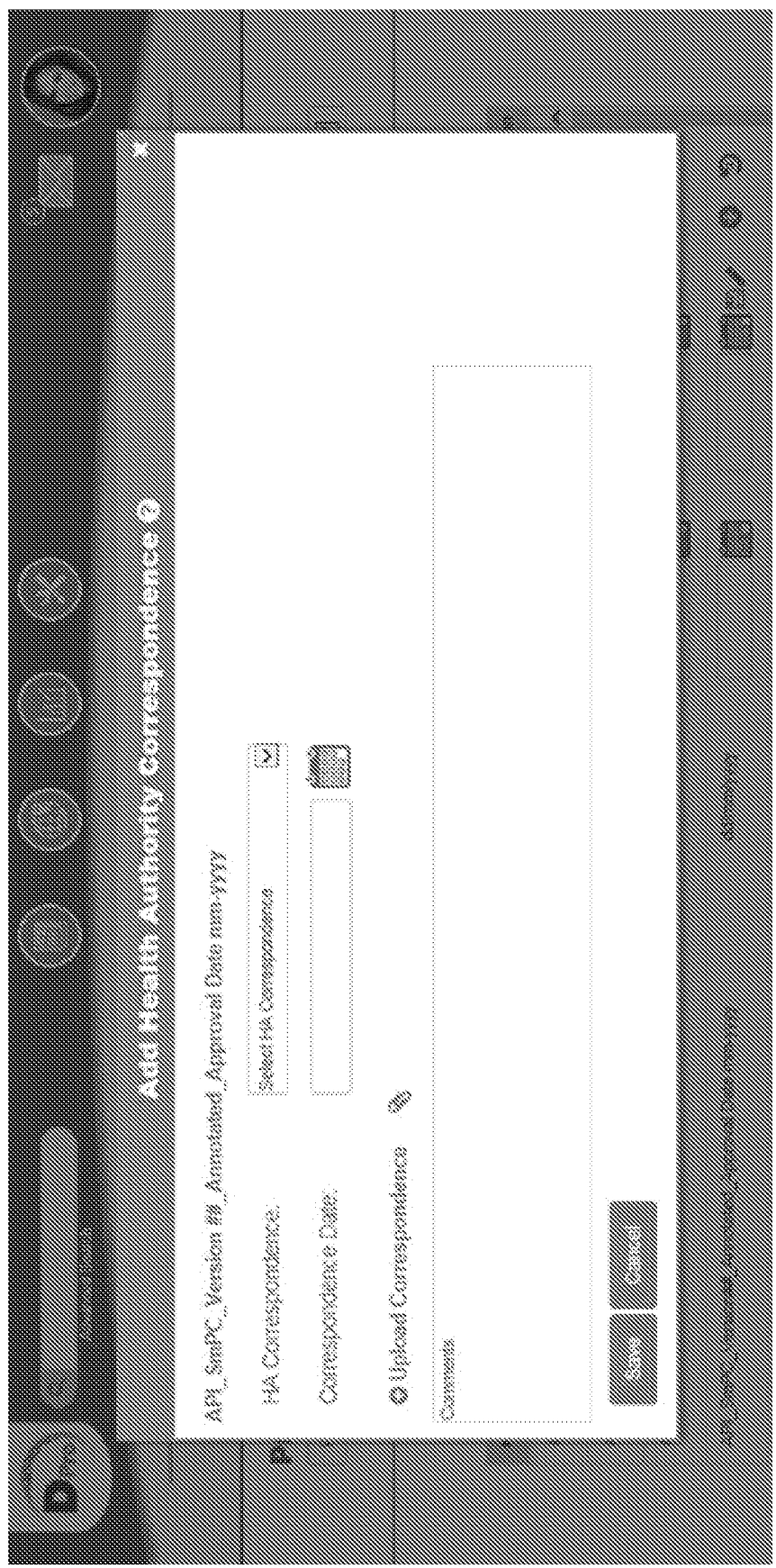
Figure 4M:
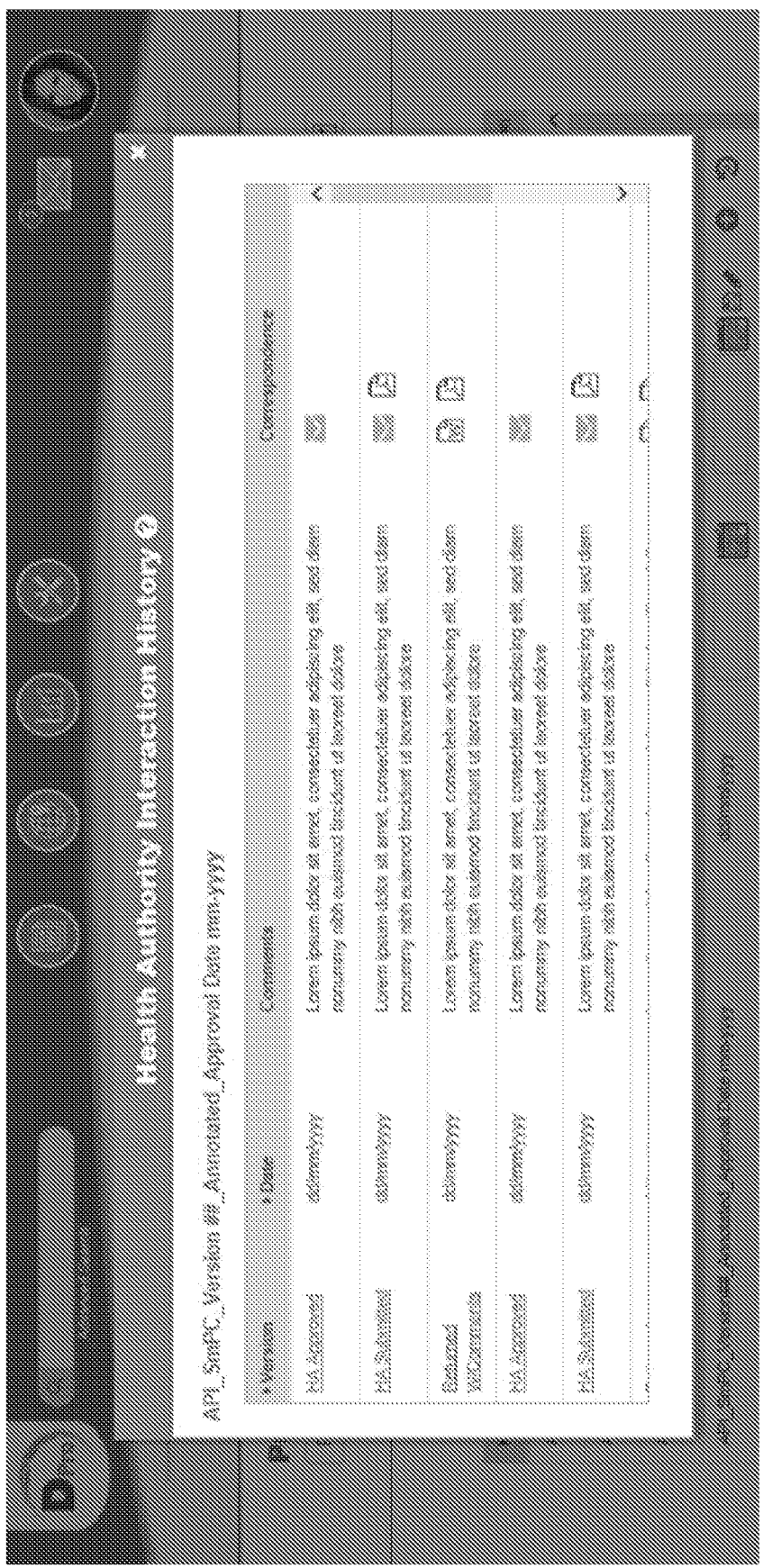
Figure 4N:
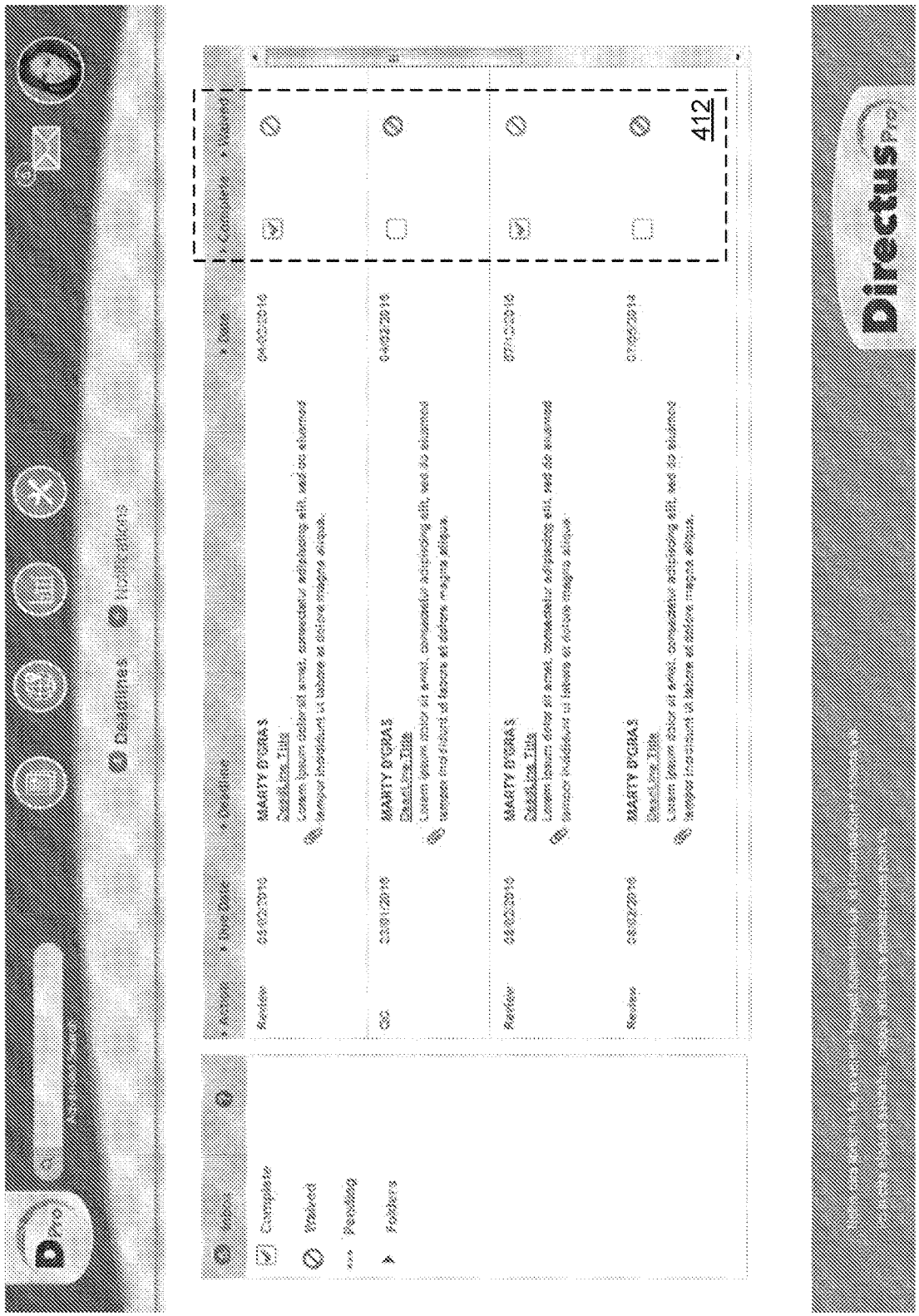
Figure 4P:
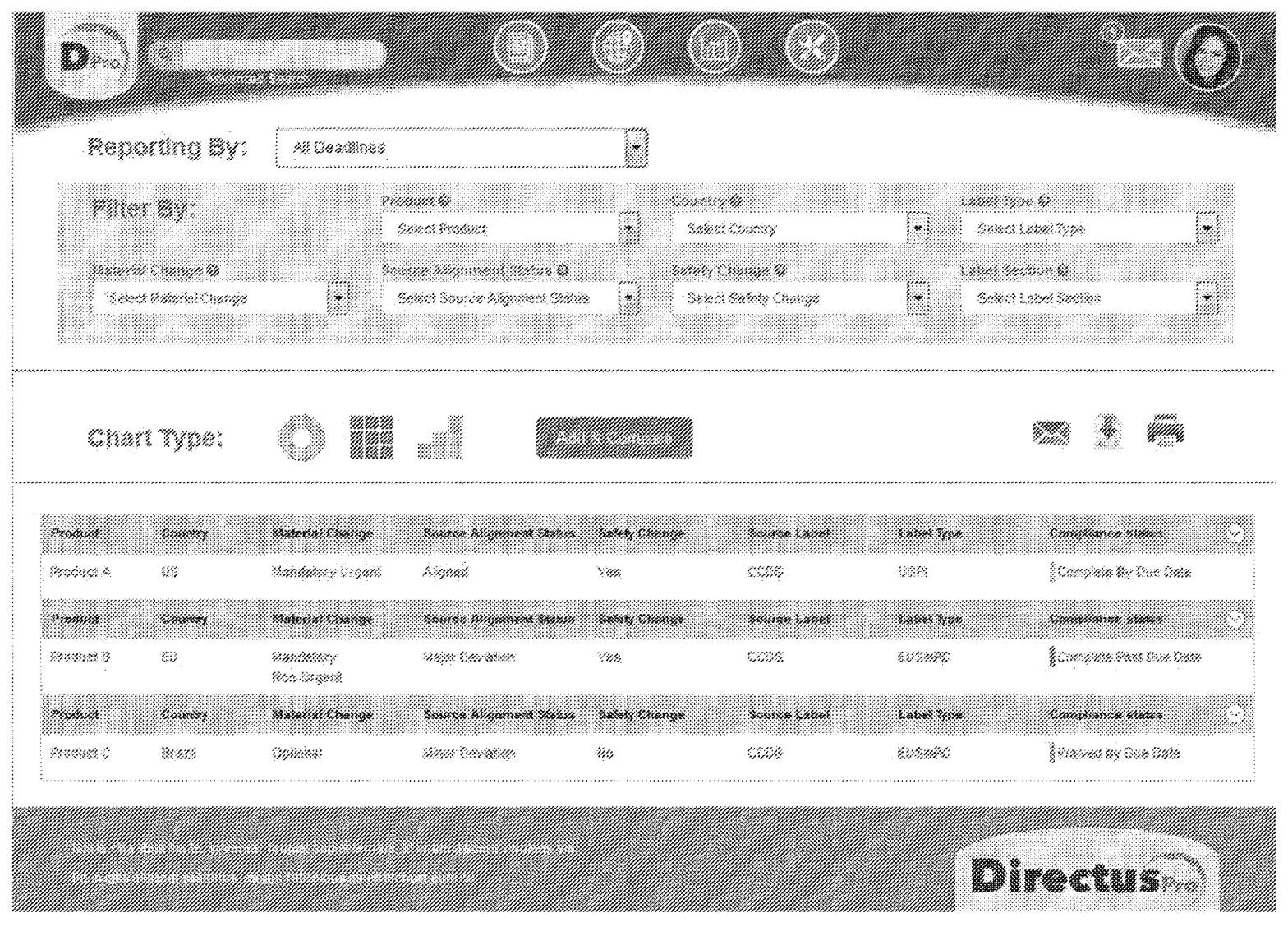
Figure 4Q:
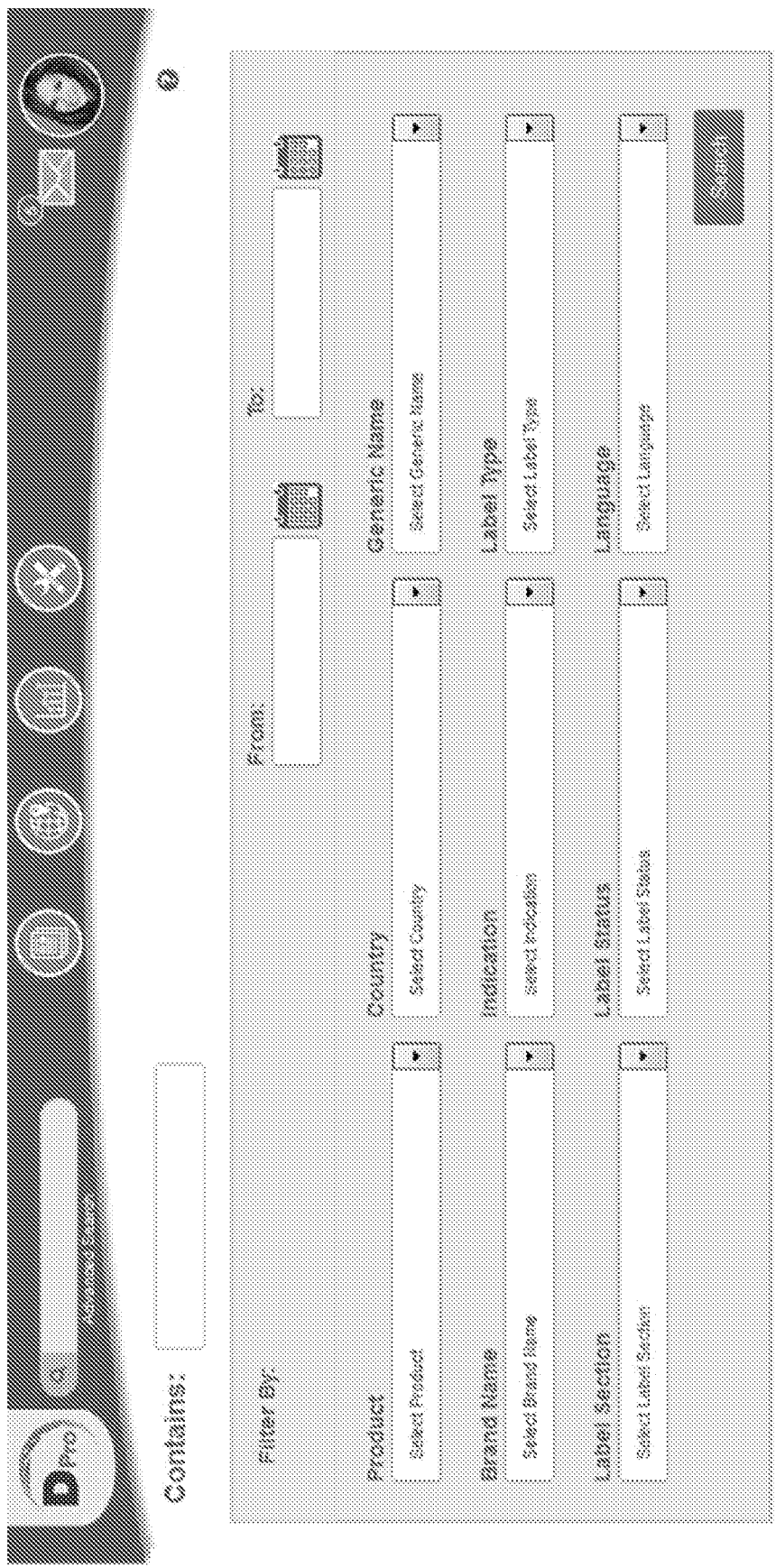

FIG. 4K depicts the "H.A. Interaction" subpage of the Local Label. All correspondence with the health authorities can be logged (e.g., as a direct entry by the user in the system or as an interface and pull from alternate systems or databases). The logged information can be stored within the database 214 depicted in FIG. 2 and can be associated to the respective product and/or label. The user can filter the information pulled and displayed on this page by selecting the product and/or country and/or label type. Internal approval, H.A. submission, and H.A. approval dates can be stored and displayed for each label. The user can also add the H.A. correspondence (e.g., using the user interface depicted in FIG. 4L) to that label and can view the history of all correspondence (e.g., using the user interface depicted in FIG. 4M). The user can then generate reports from the database utilizing this information in conjunction with other information within the database 214, for example, which local labels required an urgent change and which countries submitted those changes and when those changes were submitted. This analysis is currently not possible in any system today and is incredibly challenging without a system that consolidates the data in a structured manner within a single database or repository.

Various steps can be repeated to generate a specific label and/or to iterate through revisions and updates.

Figure 4R:
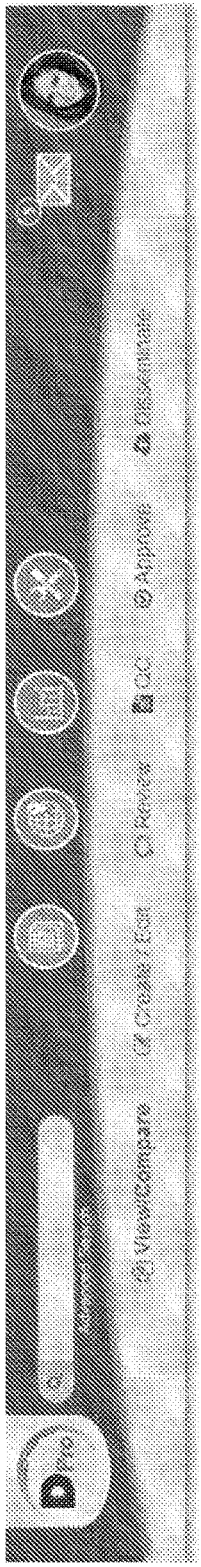

As labels and templates are created, various metadata (metadata 216 e.g., supporting reference documents) can be generated and saved. This metadata can include supporting data such as references supporting various statements in a label or template can be associated with the label or template and can be automatically compiled for submission for regulatory approval. This metadata can be tagged and linked to the respective label and specifically to the respective statement within the label and stored in database 214 or other associated storage, tracked in the system and can be aggregated and displayed in tables as depicted in FIG. 4T for efficiency. In one embodiment, when viewing a document, the user can hover over a reference and see what reference was used to create the statement, they can then click on that reference and open it. All statements with references can have a special visual indication. The user can hover over the statement or visual indication and see what reference document is attached to that statement and be able to click on it and open the attachment. This provides an advantage over conventional methods where many statements in labels go unreferenced because making those connections isn't that simple and even when they are referenced, it is hard to find the reference later on. This quick link to the references described herein enables a user experience that is much more streamlined.

Exemplary Method and Infrastructure for Managing an Update to a Product Label

Figure 5:
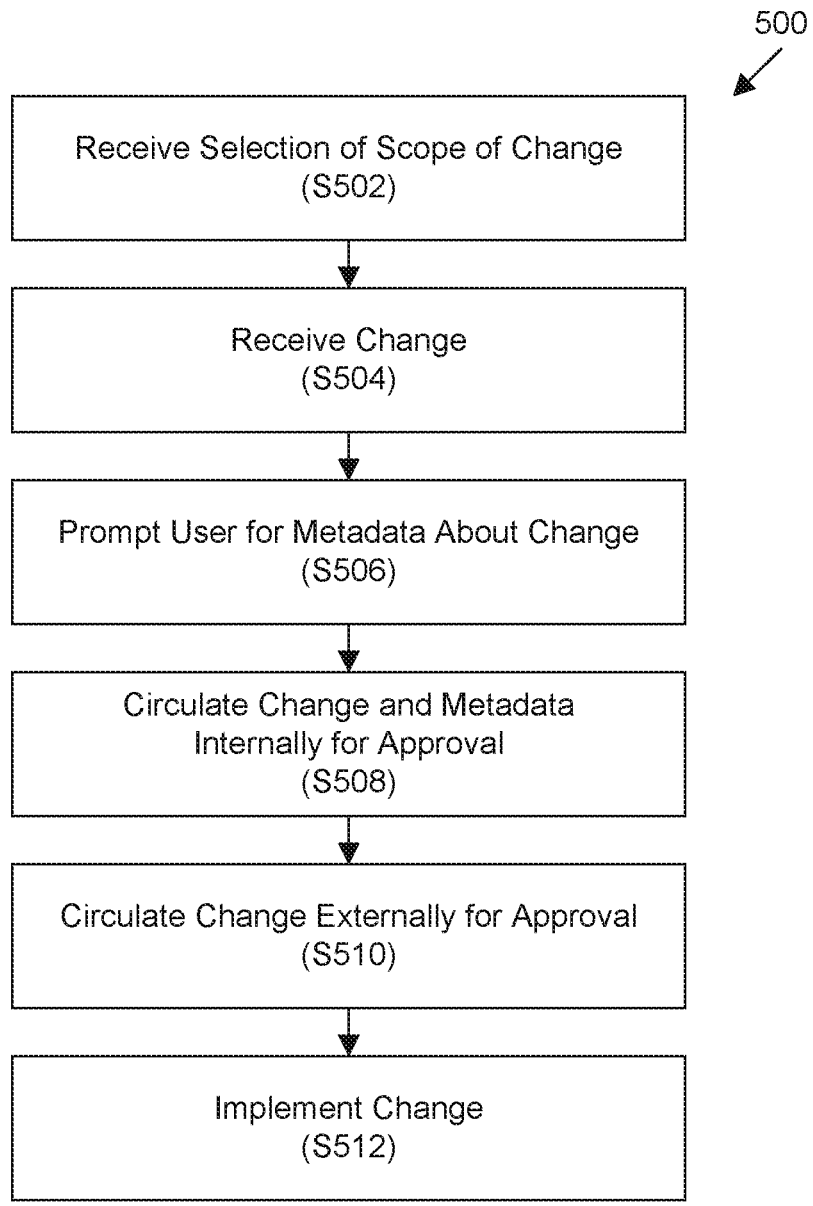
FIG. 5 depicts a method of managing an update to a product label according to an embodiment of the invention.
Figure 6:
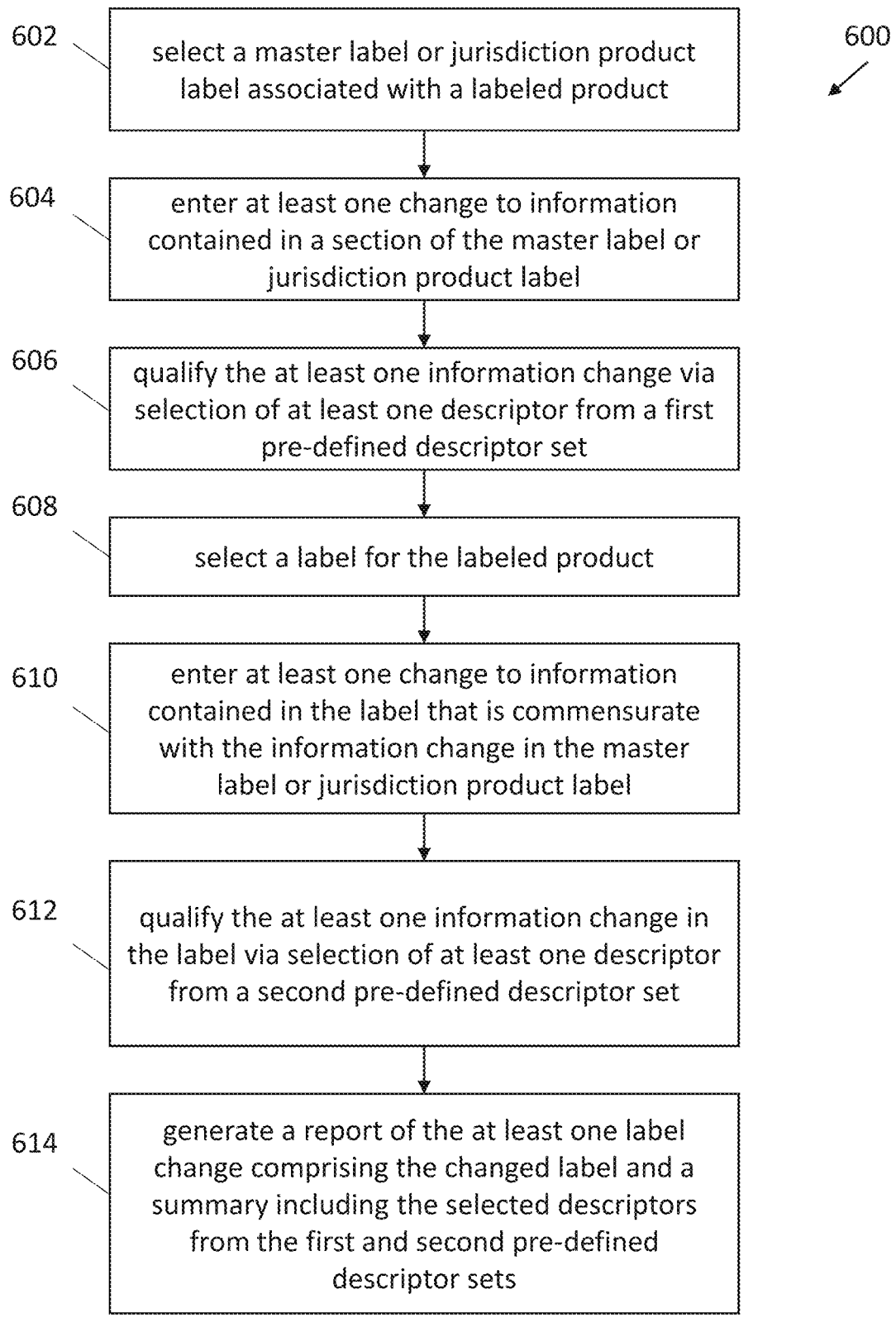
FIG. 6 depicts a computer-implemented method of updating a product label according to an embodiment of the invention.

Referring now to FIG. 5, another embodiment of the invention provides a method and infrastructure 500 for managing an update to a product label.

In step S502, a selection of scope is received. Advantageously, the nested structure of labels 208, 210, 212 and templates 202, 204, 206 described herein allows a user to generate changes of varying scope. For example, a user may desire to change only a specific label 212, in which case the scope will be that particular label 212. In other embodiments, a regulatory authority for a particular jurisdiction may require changes to all labels for a product within a particular jurisdiction, in which case the scope can be a particular main jurisdiction template 204. In still other embodiments, a company may wish to change the format of a particular type of a particular label, in which case the scope can be an auxiliary jurisdiction template 206. In still other embodiments, a company may wish to list a new contraindication for a product across all jurisdictions, in which case the scope would be a particular master label 208.

In step S504, a change can be received. For example, the change can include modification of text and/or graphics. The change can be made using a GUI such as shown in FIG. 4R.

In step S506, a prompt can be presented to the user for information regarding the change. As depicted in FIG. 4F, the information can include one or more of a change rationale, a safety change, a change type, an urgency level, and the like. For example, the change type can include one or more options such as "mandatory", "optional", "administrative", and the like. The change type can also specify a degree of congruence with a source label (e.g., the master label 208) if the change is being made to a jurisdiction label 210, 212. For example, a prompt can be presented to the user requesting a selection between options such as "major deviation", "minor deviation", "aligned", and the like. These changes are linked to the product label and can be stored in database 214, where they can be searched and/or reported on. Such searching and reporting is not possible with any other system and allows seamless reporting (e.g., for compliance purposes) at any given time.

Figure 4S:
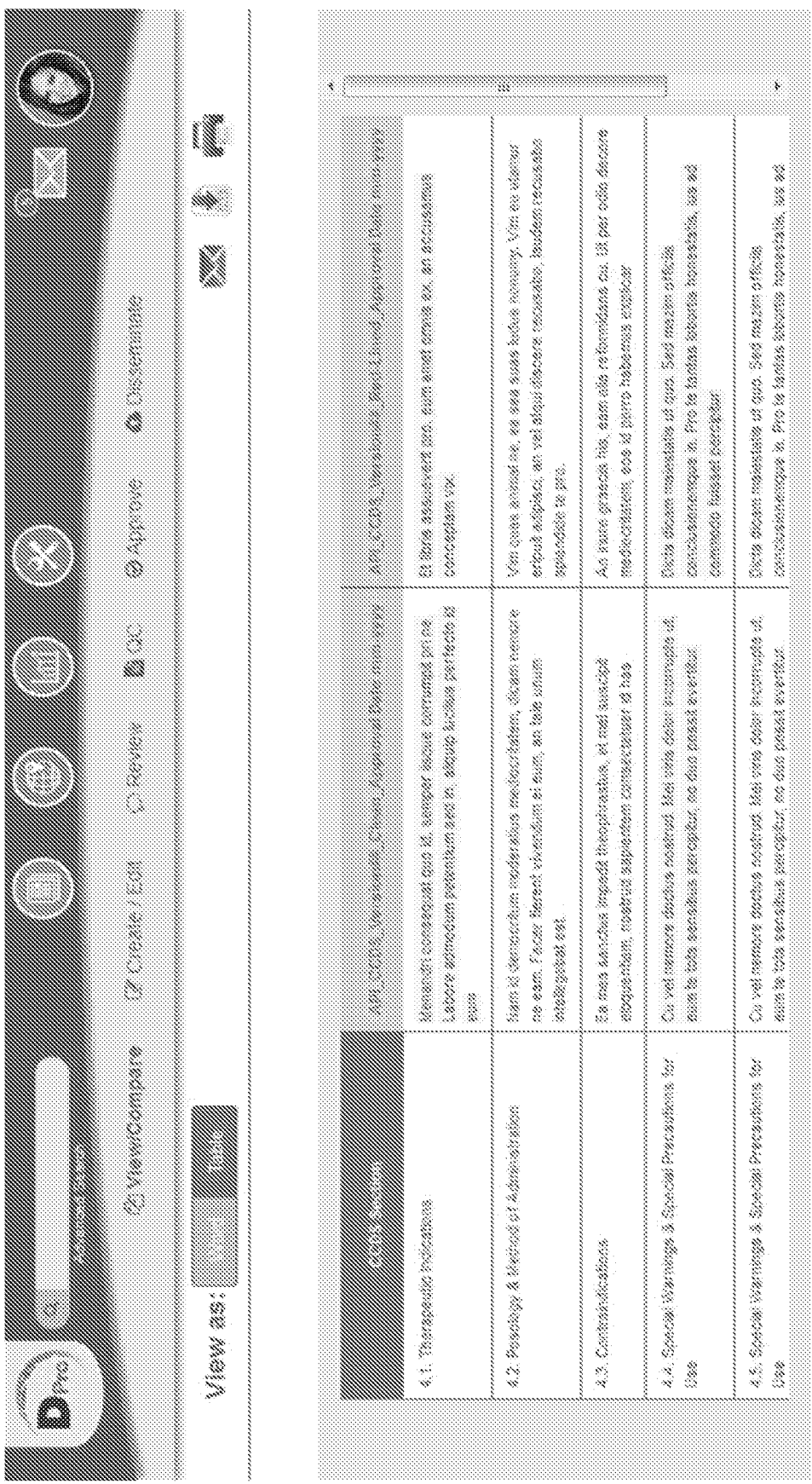
Figure 4T:
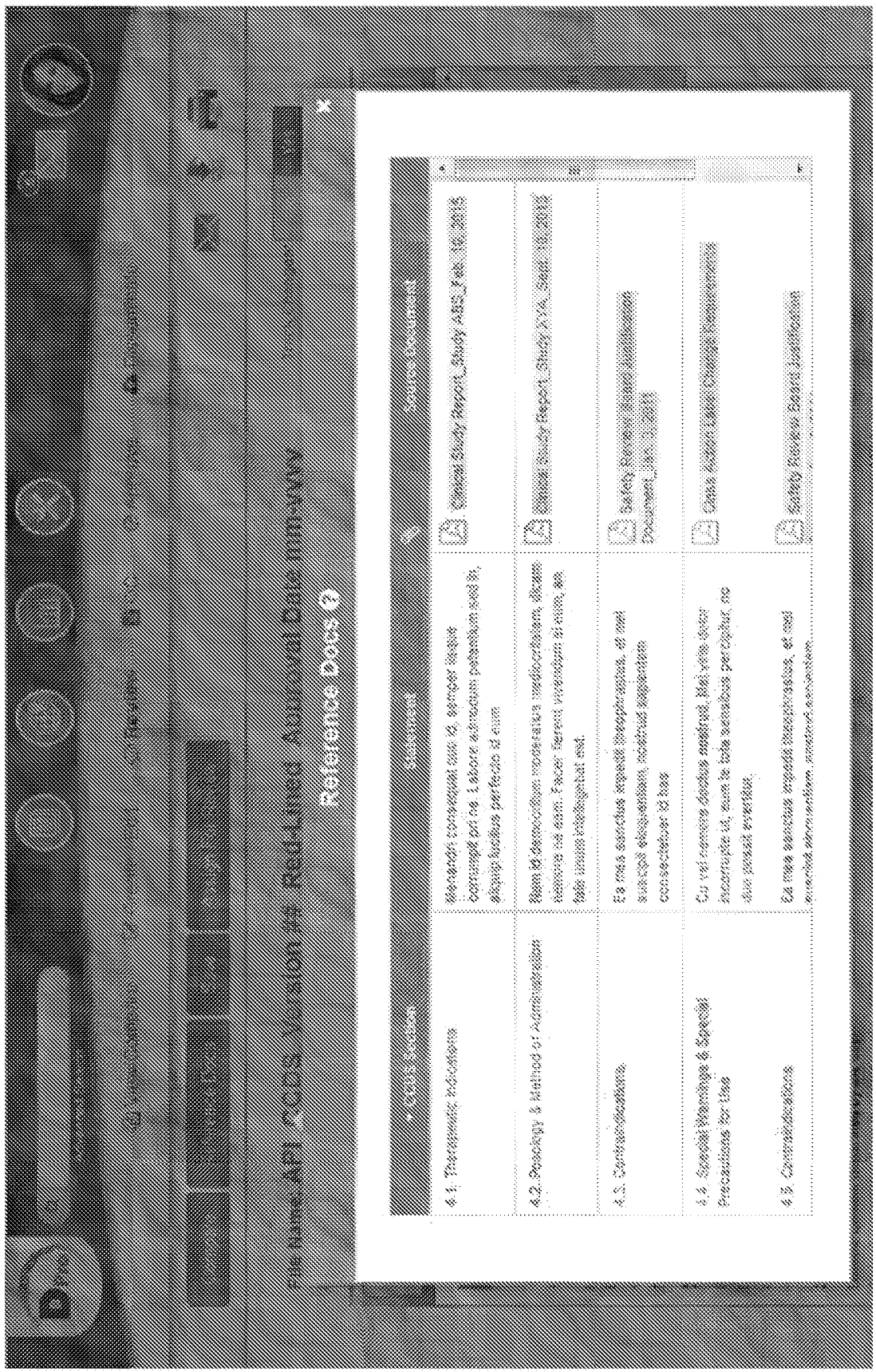

Furthermore, because the content (information) of each label can be stored within the same database 214 or repository and tagged to the associated label within the defined label structure of the templates 202, 204, 206, the data can be extracted the labels 208, 210, 212 can be compared side-by-side with each other as depicted in FIGS. 4D and 4S. Comparisons can toggle between a "word" view and a "table" view, selected based on default or user preference. One benefit of the table view is that the section sub headers are pulled into their own column, which allows the user to quickly scroll down to the section of interest. Differences in the text can automatically be highlighted so that the user can quickly identify where the two documents differ. The highlighting option may optionally be turned off. The word view gives the benefit of the user looking at the document in its normal format.

In step S508, the proposed change and associated metadata can be circulated internally for approval as described herein.

In step S510, the proposed change can be provided to the relevant health authority for approval as described herein. Appropriate metadata supporting the proposed change can also be included in the H.A. submission also as described herein.

In step S512, the change can be implemented after internal and H.A. approval.

In another embodiment, a computer-implemented method 600 of updating a product label is described. A master label or jurisdiction product label associated with a labeled product is selected 602. At least one change to information contained in a section of the master label or jurisdiction product label is entered 604. The at least one information change is qualified via selection of at least one descriptor from a first pre-defined descriptor set 606. A label is selected for the labeled product 608. At least one change to information contained in the label is entered that is commensurate with the information change in the master label or jurisdiction product label 610. The at least one information change in the label is qualified via selection of at least one descriptor from a second pre-defined descriptor set 612. A report of the at least one label change is generated including the changed label and a summary including the selected descriptors from the first and second pre-defined descriptor sets 614. In one embodiment, the first descriptor set includes pre-defined selectable options from at least one category from the group consisting of Change Rationale, Safety Change, and Change Type. In one embodiment, the pre-defined selectable options under the Change Type category include an urgency level. In one embodiment, the pre-defined selectable options under the Change Type category include an identification of mandatory, optional or administrative. In one embodiment, the second descriptor set includes pre-defined selectable options pertaining to the alignment of the information change in the label to the information change in the company core data sheet. In one embodiment, the pre-defined selectable options are from the group consisting of Major Deviation, Minor Deviation, and Aligned.

Application to Other Regulatory Submissions

Although embodiments of the invention are described in the context of pharmaceutical labels, embodiments of the system are also applicable to other regulated products such as medical device labels and drug and device CMC (Chemistry Manufacturing and Controls) information and/or documents as well as general drug and device submissions.

Implementation in Computer-Readable Media and/or Hardware

The methods described herein can be readily implemented in software that can be stored in computer-readable media for execution by a computer processor, whether locally or remotely (e.g., over a network or "in the cloud"). For example, the computer-readable media can be volatile memory (e.g., random access memory and the like) and/or non-volatile memory (e.g., read-only memory, hard disks, floppy disks, magnetic tape, optical discs, paper tape, punch cards, and the like).

Additionally or alternatively, the methods described herein can be implemented in computer hardware such as an application-specific integrated circuit (ASIC).

EQUIVALENTS

Although preferred embodiments of the invention have been described using specific terms, such description is for illustrative purposes only, and it is to be understood that changes and variations may be made without departing from the spirit or scope of the following claims.

For example, the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., modules, databases, computers, clients, servers and the like) shown as distinct for purposes of illustration can be incorporated within other functional elements, separated in different hardware or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

INCORPORATION BY REFERENCE

The entire contents of all patents, published patent applications, and other references cited herein are hereby expressly incorporated herein in their entireties by reference.

The invention claimed is:

1. A system for generating and managing product labels for a product across a plurality of jurisdictions, the system comprising:
a computer comprising a storage device comprising:
a database management system; and
computer-readable program code including steps for:
generating a master label for the product by:
presenting a first graphical user interface comprising:
a plurality of master template headers stored, at least in part, in the database management system; and
corresponding master label fields for input of master label content associated with the master template headers;
receiving master label input to the corresponding master label fields via the first graphical user interface; and
storing the master label content input in a master label data structure at least in part in the database management system;
presenting a second graphical user interface comprising:
the plurality of master template headers;
corresponding master label content stored in the master label data structure stored, at least in part, in the database management system;
a plurality of jurisdiction template headers stored, at least in part, in the database management system; and
corresponding jurisdiction-specific product label fields for input of jurisdiction-specific product label content associated with the jurisdiction-specific product label headers;
allowing a user to select and modify portions of the master label content to populate the jurisdiction-specific product label fields;
receiving jurisdiction-specific product label input to the corresponding jurisdiction-specific product label fields via the second graphical user interface; and
storing the jurisdiction-specific product label input in a jurisdiction-specific product label data structure at least in part in the database management system;
wherein the second graphical user interface displays the master label and the jurisdiction-specific label side-by-side; and
wherein the second graphical user interface is further configured to synchronize positioning of the master label and the jurisdiction-specific label along a vertical axis of the second graphical user interface such that corresponding content of the master label and the jurisdiction-specific label text are shown at the same position along the vertical axis.

2. The system of claim 1, wherein the master label data structure comprises:
references to master template headers from the master label data structure; and
modified master label headers.

3. The system of claim 1, wherein the master label data structure and the jurisdiction-specific product label data structure are implemented in a database.

4. The system of claim 1, wherein the plurality of master template headers are defined by a master template.

5. The system of claim 1, wherein the master label data structure and the jurisdiction-specific product label data structure contain references to a database.

6. The system of claim 1, wherein the computer-readable program code further includes steps for:
presenting the master label or the jurisdiction-specific product label to one or more users for review, QC, or approval based on a workflow specified in computer-readable media.

7. The system of claim 6, wherein the computer-readable program code further includes steps for:
tracking the review, QC, or approval of the master label or the jurisdiction-specific product label in computer-readable media.

8. The system of claim 7, wherein the computer-readable program code further includes steps for:
generating a report detailing the tracked review, QC, and approval of the master label or the jurisdiction-specific product label.

9. The system of claim 1, wherein the corresponding content is identified independent of text contained therein.

10. The system of claim 1, wherein the computer-readable program code further includes steps for:
receiving a request to change a portion of at least one of the master label and the jurisdiction-specific product label; and
prompting the user to qualify the requested change by selecting at least one descriptor from a pre-defined descriptor set including one or more selected from the group consisting of: a change rationale, a safety change, a change type, alignment to a source label, and label deadlines.

11. The system of claim 10, wherein the computer-readable program code further includes steps for:
tracking the requested changes; and
generating a report of changes, the report comprising:
the at least one descriptor selected from the pre-defined descriptor set;
a status of an anticipated change to a label;
a status of a changed label; and
a summary of the changes.

12. The system of claim 10, wherein the change rationale metadata requires identification of a reason for the change.

13. The system of claim 10, wherein the reason for the change can include one or more selected from the group consisting of: "new data", "health authority request", and "update to source label".

14. The system of claim 10, wherein the "change type" metadata requires identification of the change selected from the group consisting of: "urgent", "non-urgent", "mandatory", "optional", and "administrative".

15. The system of claim 10, wherein the "alignment to source label" metadata requires identification of a degree of the change in relationship to a source label and selected from the group consisting of: "major deviation", "minor deviation", and "aligned".

16. The system of claim 10, wherein the "label deadlines" metadata requires identification of a deadline for implementation of the change.

17. The system of claim 16, wherein the "label deadlines" metadata further comprises identification of compliance to the identified deadline for implementation of the change.

18. The system of claim 17, wherein the identification of compliance is selected from the group consisting of: "compliant", "not applicable", and "delegated".

19. A system for generating and managing product labels for a product across a plurality of jurisdictions, the system comprising:
 a computer comprising a storage device comprising:
  a database management system; and
  computer-readable program code including steps for:
   generating a master label for the product by:
    presenting a first graphical user interface comprising:
     a plurality of master template headers stored, at least in part, in the database management system; and
     corresponding master label fields for input of master label content associated with the master template headers;
    receiving master label input to the corresponding master label fields via the first graphical user interface; and
    storing the master label content input in a master label data structure at least in part in the database management system;
   presenting a second graphical user interface comprising:
    the plurality of master template headers;
    corresponding master label content stored in the master label data structure stored, at least in part, in the database management system;
    a plurality of jurisdiction template headers stored, at least in part, in the database management system; and
    corresponding jurisdiction-specific product label fields for input of jurisdiction-specific product label content associated with the jurisdiction-specific product label headers;
   allowing a user to select and modify portions of the master label content to populate the jurisdiction-specific product label fields;
   receiving jurisdiction-specific product label input to the corresponding jurisdiction-specific product label fields via the second graphical user interface; and
   storing the jurisdiction-specific product label input in a jurisdiction-specific product label data structure at least in part in the database management system;
   wherein the jurisdiction-specific product label data structure comprises:
    references to jurisdiction template headers from the jurisdiction template;
    modified jurisdiction label headers;
    references to unmodified label elements from the master label data structure; and
    modified label elements relative to the master label data structure.

20. A system for generating and managing product labels for a product across a plurality of jurisdictions, the system comprising:
 a computer comprising a storage device comprising:
  a database management system; and
  computer-readable program code including steps for:
   generating a master label for the product by:
    presenting a first graphical user interface comprising:
     a plurality of master template headers stored, at least in part, in the database management system; and
     corresponding master label fields for input of master label content associated with the master template headers;
    receiving master label input to the corresponding master label fields via the first graphical user interface; and
    storing the master label content input in a master label data structure at least in part in the database management system;
   presenting a second graphical user interface comprising:
    the plurality of master template headers;
    corresponding master label content stored in the master label data structure stored, at least in part, in the database management system;
    a plurality of jurisdiction template headers stored, at least in part, in the database management system; and
    corresponding jurisdiction-specific product label fields for input of jurisdiction-specific product label content associated with the jurisdiction-specific product label headers;
   allowing a user to select and modify portions of the master label content to populate the jurisdiction-specific product label fields;
   receiving jurisdiction-specific product label input to the corresponding jurisdiction-specific product label fields via the second graphical user interface; and
   storing the jurisdiction-specific product label input in a jurisdiction-specific product label data structure at least in part in the database management system;
   wherein at least one of the master label data structure and the jurisdiction-specific product label data structure includes change tracking data.

* * * * *